(12) United States Patent
Sakakibara et al.

(10) Patent No.: US 9,868,469 B2
(45) Date of Patent: Jan. 16, 2018

(54) VEHICULAR OBJECT DETECTION DEVICE

(71) Applicant: TOYOTA JIDOSHA KABUSHIKI KAISHA, Toyota-shi, Aichi-ken (JP)

(72) Inventors: Kosuke Sakakibara, Toyota (JP); Masanobu Ohmi, Kasugai (JP); Seiji Yamamoto, Seto (JP); Yoshiaki Matsumura, Toyota (JP); Kazuki Sugie, Miyoshi (JP); Misato Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/453,134

(22) Filed: Mar. 8, 2017

(65) Prior Publication Data
US 2017/0327152 A1  Nov. 16, 2017

(30) Foreign Application Priority Data

May 12, 2016 (JP) ................................. 2016-096186

(51) Int. Cl.
*B60N 99/00* (2006.01)
*B62D 25/02* (2006.01)

(52) U.S. Cl.
CPC ................. *B62D 25/025* (2013.01)

(58) Field of Classification Search
CPC ................................................. B62D 25/025
See application file for complete search history.

(56) References Cited

U.S. PATENT DOCUMENTS

2015/0314809 A1* 11/2015 Kindaichi ............ B62D 25/025
296/193.05

FOREIGN PATENT DOCUMENTS

| JP | H09-301123 A | 11/1997 |
|---|---|---|
| JP | 2008-254702 A | 10/2008 |

* cited by examiner

*Primary Examiner* — Lori L Lyjak
(74) *Attorney, Agent, or Firm* — Oliff PLC

(57) ABSTRACT

A vehicular object detection device including: a rocker section that extends substantially along a vehicle front-rear direction, at a lower side of a side section of a vehicle, and that is configured by plural rocker configuration members; and an object detection sensor that is disposed in the rocker section and that detects an object at at least one of a side or the lower side of the vehicle, wherein: among the plural rocker configuration members, a rocker configuration member disposed at a vehicle width direction outer side of the object detection sensor is configured by a resin, or the rocker configuration member disposed at the vehicle width direction outer side of the object detection sensor is formed with a detection opening that is open toward a vehicle outer side at a position corresponding to a transceiver of the object detection sensor.

7 Claims, 17 Drawing Sheets

VEHICULAR OBJECT DETECTION DEVICE

CROSS-REFERENCE TO RELAYED APPLICATION

This application is based on and claims priority under 35 USC 119 from Japanese Patent Application No. 2016-096186 filed on May 12, 2016, the disclosure of which is incorporated by reference herein.

BACKGROUND

Technical Field

The present disclosure relates to a vehicular object detection device.

Related Art

Japanese Patent Application Laid-Open (JP-A) No. H09-301123 describes a vehicular side warning sensor device. The vehicular side warning sensor device includes an opening formed in a recess in an outer handle of a rear door, and an object detection sensor provided at a position corresponding to the recess inside the rear door and capable of transmitting and receiving ultrasound waves through the opening. Thus, obstacles and other vehicles at the side of the vehicle are detected.

However, in the configuration described in JP-A No. H09-301123, the object detection sensor is provided in a position corresponding to the recess in the outer handle of the rear door, and so the position where the object detection sensor is provided is limited to the position of the outer handle.

There is accordingly room for improvement of the related art regarding this point.

SUMMARY

In consideration of the above issue, the present disclosure provides a vehicular object detection device capable of increasing the degrees of freedom of a position where an object detection sensor is provided.

A vehicular object detection device of a first aspect of the present disclosure includes a rocker section that extends substantially along a vehicle front-rear direction at a lower side of a side section of a vehicle and that is configured by plural rocker configuration members, and an object detection sensor that is disposed in the rocker section and that detects an object at at least one out of a side or the lower side of the vehicle. Among the plural rocker configuration members, a rocker configuration member disposed at a vehicle width direction outer side of the object detection sensor is configured by a resin, or the rocker configuration member disposed at the vehicle width direction outer side of the object detection sensor is formed with a detection opening that is open toward a vehicle outer side at a position corresponding to a transceiver of the object detection sensor.

In the first aspect of the present disclosure, the object detection sensor is disposed in the rocker section extending along substantially the vehicle front-rear direction at the lower side of the side of the vehicle. The rocker configuration member disposed at the vehicle width direction outer side of the object detection sensor is configured by a resin, or is formed with the detection opening. Thus, reflection of electromagnetic waves or the like by the rocker configuration member is suppressed when the object detection sensor detects an object at the vehicle exterior using the electromagnetic waves or the like. Namely, the object detection sensor can be disposed in a required position from over a wide range in the vehicle front-rear direction along the rocker section, without detection of objects by the object detection sensor being hindered by the rocker configuration member.

Note that "object" includes vehicles traveling alongside the vehicle, the road shoulder, a median strip, road studs and markers embedded in the road surface, as well as road signs and the like.

A vehicular object detection device of a second aspect of the present disclosure is the first aspect, wherein among the plural rocker configuration members, a rocker configuration member adjacent to the object detection sensor in the vehicle width direction is integrally molded with a holder that is configured by a resin and that retains the object detection sensor.

In the second aspect of the present disclosure, the rocker configuration member adjacent to the object detection sensor in the vehicle width direction is integrally molded with the holder that retains the object detection sensor. This facilitates the positioning and attachment operation when attaching the object detection sensor to this rocker configuration member.

A vehicular object detection device of a third aspect of the present disclosure is the second aspect, wherein another of the rocker configuration members is disposed at the vehicle width direction outer side of the rocker configuration member integrally molded with the holder, so as to cover a location of the rocker configuration member where the holder is formed.

In the third aspect of the present disclosure, due to the other rocker configuration member, the location where the holder is formed on the rocker configuration member integrally molded with the holder is not liable to be visible from the vehicle exterior. Namely, even if sink marks occur on the rocker configuration member due to integrally molding the holder thereto, these sink marks are not liable to be visible from the vehicle exterior.

A vehicular object detection device of a fourth aspect of the present disclosure is any one of the first to the third aspects, wherein a recess that is indented toward one side in the vehicle width direction and that restricts movement of the object detection sensor in a vehicle vertical direction by having at least a portion of the object detection sensor disposed inside, is formed at one of the rocker configuration members adjacent to the object detection sensor.

In the fourth aspect of the present disclosure, the recess that restricts vehicle vertical direction movement of the object detection sensor is formed the rocker configuration member adjacent to the object detection sensor. This enables the object detection sensor to be reliably fixed in a pre-set position. Namely, this enables a shift in the detection range due to positional misalignment of the object detection sensor to be suppressed.

A vehicular object detection device of a fifth aspect of the present disclosure is any one of the first to the fourth aspects, wherein a shock-absorbing member that is configured by a foamed resin and that absorbs collision load is provided at a rocker configuration member, among the plural rocker configuration members, which is adjacent to the vehicle width direction outer side of the object detection sensor and which is configured by a resin, and a shock-absorbing member-side holder that retains the object detection sensor is formed at the vehicle width direction inner side of the shock-absorbing member.

In the fifth aspect of the present disclosure, the object detection sensor is retained by the shock-absorbing member-side holder of the shock-absorbing member. The object detection sensor is attached to the respective rocker configuration member through the shock-absorbing member, such that collision load input to the rocker configuration member during a vehicle side-on collision (hereafter simply referred to as "vehicle side collision") is transmitted to the object detection sensor through the shock-absorbing member. Namely, this enables direct input of collision load to the object detection sensor to be suppressed.

A vehicular object detection device of a sixth aspect of the present disclosure is the any one of the first to the fourth aspects, wherein a lid that is configured by a resin is provided at the detection opening formed in the rocker configuration member so as to block the detection opening.

In the sixth aspect of the present disclosure, the detection opening is blocked by the lid. Thus, electromagnetic waves or the like are transmitted and received through the lid when the object detection sensor is operating, and the object detection sensor can be protected by the lid from foreign matter such as flying stones.

A vehicular object detection device of a seventh aspect of the present disclosure is the sixth aspect, wherein a movable lid is provided at the detection opening formed in the rocker configuration member such that the movable lid opens the detection opening formed in the rocker configuration member when the object detection sensor is operating, and closes the detection opening when the object detection sensor is not operating.

In the seventh aspect of the present disclosure, the detection opening can be opened by the movable lid when the object detection sensor is operating, and the detection opening can be closed by the movable lid when the object detection sensor is not operating. This enables electromagnetic waves or the like to be transmitted and received through the detection opening when the object detection sensor is operating. This also enables the object detection sensor to be protected by the movable lid from foreign matter such as flying stones when the object detection sensor is not operating.

The vehicular object detection device of the first aspect of the present disclosure has an excellent advantageous effect of enabling the degrees of freedom of the position where the object detection sensor is provided to be increased.

The vehicular object detection device of the second aspect of the present disclosure has an excellent advantageous effect of enabling the ease of the attachment operation of the object detection sensor to the rocker section to be improved.

The vehicular object detection device of the third aspect of the present disclosure has an excellent advantageous effect of enabling a reduction in the quality of the external appearance of the vehicle side section to be suppressed.

The vehicular object detection device of the fourth aspect of the present disclosure has an excellent advantageous effect of enabling the detection precision of the object detection sensor to be improved.

The vehicular object detection device of the fifth aspect of the present disclosure has an excellent advantageous effect of enabling damage to the object detection sensor during a vehicle side collision to be suppressed.

The vehicular object detection device of the sixth aspect of the present disclosure has an excellent advantageous effect of enabling damage to the object detection sensor occurring due to foreign matter entering the detection opening to be suppressed in cases in which a detection opening is provided in the rocker configuration member.

The vehicular object detection device of the seventh aspect of the present disclosure has an excellent advantageous effect of enabling damage to the object detection sensor occurring due to foreign matter entering the detection opening when the object detection sensor is not operating to be suppressed in cases in which a detection opening is provided in the rocker configuration member.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
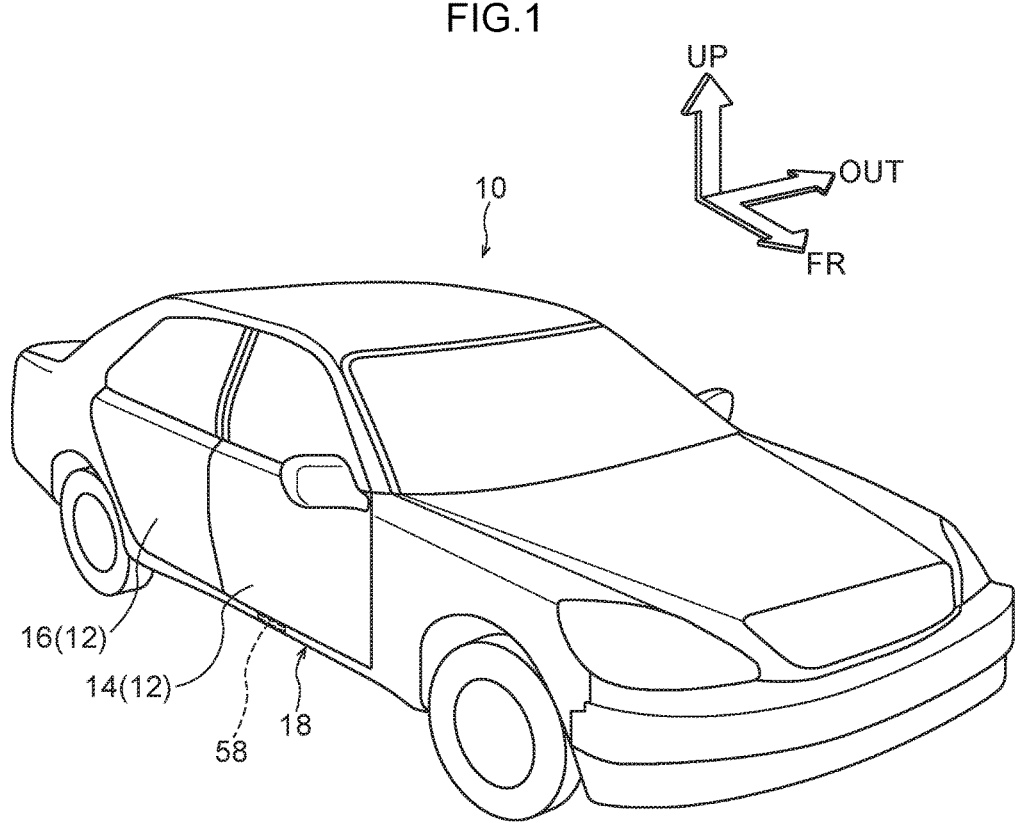
FIG. 1 is a perspective view illustrating a vehicle including a vehicular object detection device according to a first exemplary embodiment in a state viewed diagonally from the vehicle front.

Explanation follows regarding a first exemplary embodiment of a vehicular object detection device according to the present disclosure, with reference to FIGS. 1 to 4. In the drawings, the arrow FR indicates the vehicle front-rear direction front side, the arrow OUT indicates the vehicle width direction outer side, and the arrow UP indicates the vehicle vertical direction upper side.

As illustrated in FIG. 1, a left and right pair of rocker sections 18, which each extend along the vehicle front-rear direction at the vehicle lower side of side doors 12 (a front side door 14 and a rear side door 16), are respectively provided to side sections of a vehicle 10. Note that, since the rocker sections 18 are the same as each other with left-right symmetry, explanation follows regarding one from out of the left or right side, and explanation regarding the other from out of the left or right side is omitted as appropriate.

Figure 2:
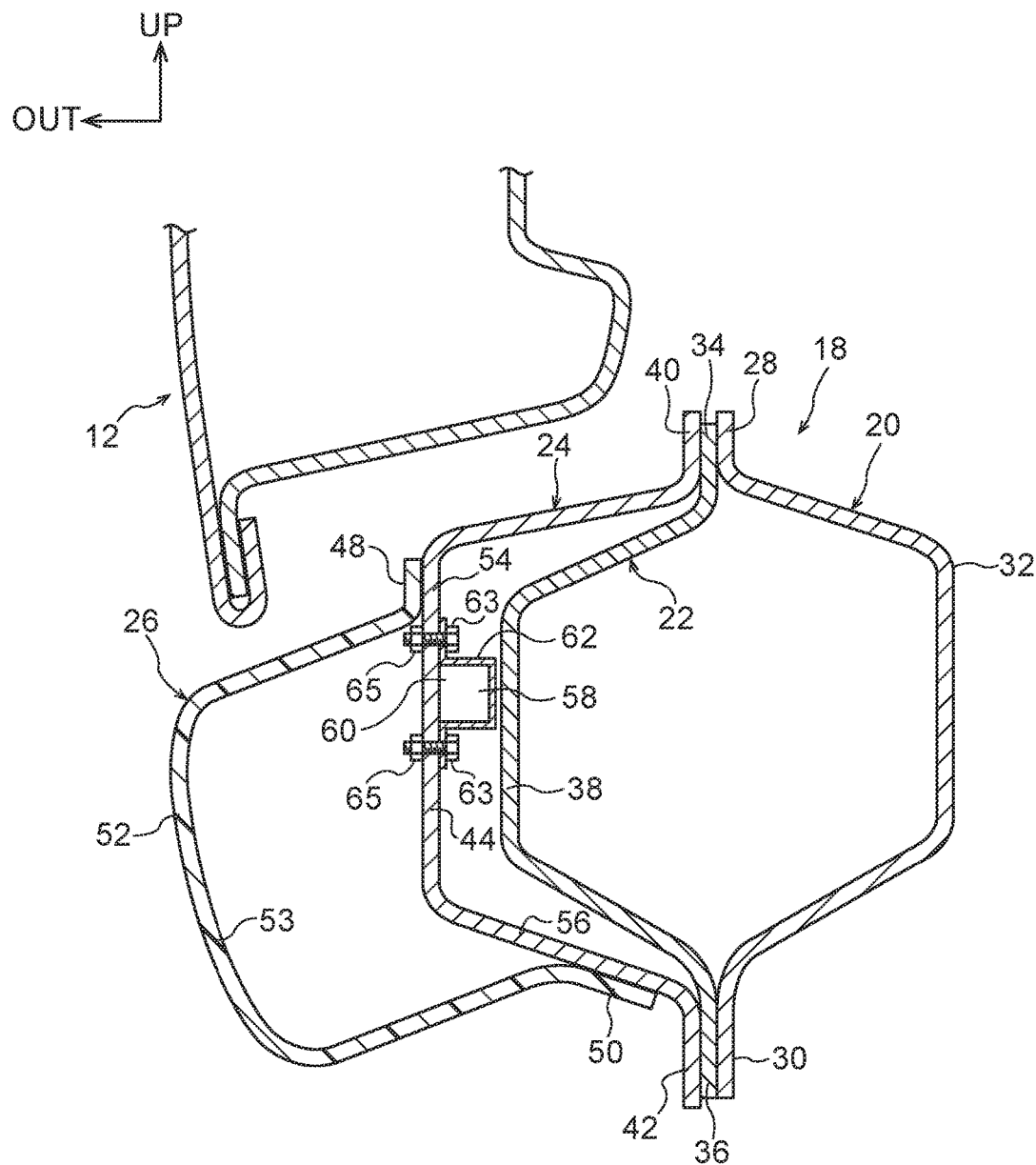
FIG. 2 is a vertical cross-section illustrating a vehicular object detection device according to the first exemplary embodiment in a state viewed from the vehicle front.
Figure 3:
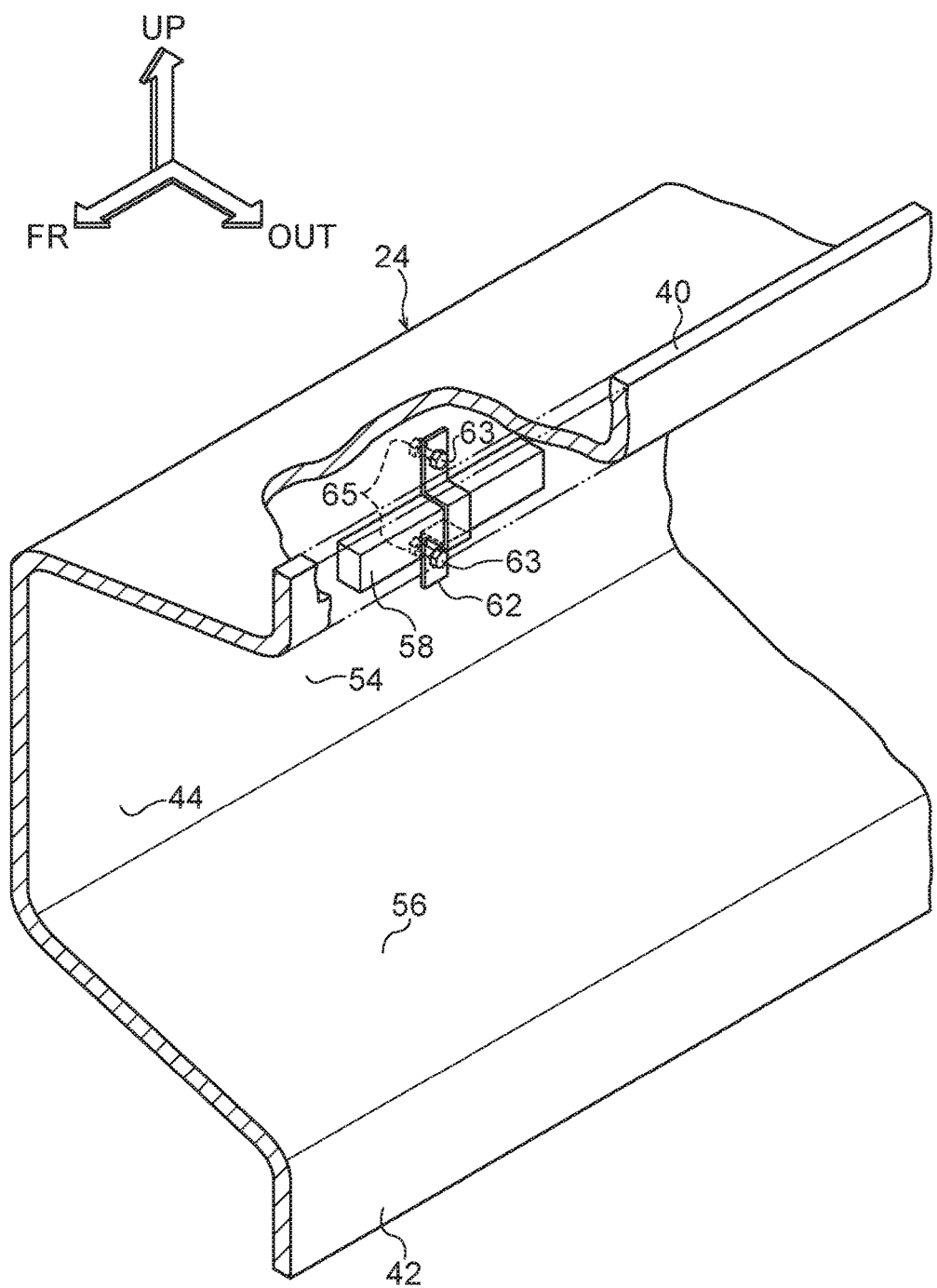
FIG. 3 is a perspective view illustrating a vehicular object detection device according to the first exemplary embodiment in an assembled state.

As illustrated in FIG. 2, each rocker section 18 includes, as rocker configuration members, a rocker inner panel 20 disposed at the vehicle width direction inner side, a rocker reinforcement panel 22 disposed at the vehicle width direction outer side of the rocker inner panel 20, a side member outer panel 24 disposed at the vehicle width direction outer side of the rocker reinforcement panel 22, and a rocker molding 26 disposed at the vehicle width direction outer side of the side member outer panel 24.

The rocker inner panel 20 is configured by a metal, and has a hat shaped profile in cross-section orthogonal to the vehicle front-rear direction. Specifically, the rocker inner panel 20 is configured including an upper flange 28 extending along the vehicle vertical direction, a lower flange 30 provided extending along the vehicle vertical direction on the opposite side to the upper flange 28, and an intermediate portion 32 provided between the upper flange 28 and the lower flange 30. The intermediate portion 32 of the rocker inner panel 20 projects out toward the vehicle width direction inner side in a vehicle front view.

The rocker reinforcement panel 22 is configured by a metal, and has a hat shaped profile in cross-section orthogonal to the vehicle front-rear direction. Specifically, the rocker reinforcement panel 22 is configured including an upper flange 34 extending along the vehicle vertical direction, a lower flange 36 provided extending along the vehicle vertical direction on the opposite side to the upper flange 34, and an intermediate portion 38 provided between the upper flange 34 and the lower flange 36. The intermediate portion 38 of the rocker reinforcement panel 22 projects out toward the vehicle width direction outer side in a vehicle front view.

The side member outer panel 24 is configured by a resin, and has a hat shaped profile in cross-section orthogonal to the vehicle front-rear direction. Specifically, the side member outer panel 24 is configured including an upper flange 40 extending along the vehicle vertical direction, a lower flange 42 provided extending along the vehicle vertical direction on the opposite side to the upper flange 40, and an intermediate portion 44 provided between the upper flange 40 and the lower flange 42. The intermediate portion 44 of the side member outer panel 24 projects out toward the vehicle width direction outer side in a vehicle front view.

The upper flange 28 of the rocker inner panel 20 is welded to the upper flange 34 of the rocker reinforcement panel 22, and the lower flange 30 of the rocker inner panel 20 is welded to the lower flange 36 of the rocker reinforcement panel 22. The upper flange 40 of the side member outer panel 24 is joined by adhesive to the upper flange 34 of the rocker reinforcement panel 22, and the lower flange 42 of the side member outer panel 24 is joined by adhesive to the lower flange 36 of the rocker reinforcement panel 22. Note that the method of joining the side member outer panel 24 and the rocker reinforcement panel 22 is not limited to adhesive, and joining may be performed by hemming or another method.

The rocker molding 26 is configured by a resin, and has a hat shaped profile in cross-section orthogonal to the vehicle front-rear direction. Specifically, the rocker molding 26 is configured including an upper flange 48 extending along the vehicle vertical direction, a lower flange 50 provided extending toward substantially the vehicle width direction inner side on the opposite side to the upper flange 48, and an intermediate portion 52 provided between the upper flange 48 and the lower flange 50. The intermediate portion 52 of the rocker molding 26 projects out toward the vehicle width direction outer side in a vehicle front view. The upper flange 48 of the rocker molding 26 abuts a wall 54 extending along the vehicle vertical direction at the intermediate portion 44 of the side member outer panel 24, and is fixed thereto by plural clips, not illustrated in the drawings. Similarly, the lower flange 50 of the rocker molding 26 abuts a wall 56 extending along substantially the vehicle width direction at the intermediate portion 44 of the side member outer panel 24, and is fixed thereto by plural clips, not illustrated in the drawings. The rocker section 18 is accordingly configured with a closed cross-section structure by the respective rocker configuration members.

An object detection sensor 58 is provided between the rocker reinforcement panel 22 and the side member outer panel 24. The object detection sensor 58 is formed in a substantially angular column shape, and transmits and receives infrared, electromagnetic waves such as radio waves, or ultrasound waves to and from the vehicle width direction outer side to and from a transceiver 60 provided at the vehicle width direction outer side thereof, thereby enabling objects located at at least one out of a side or the lower side of the vehicle 10 to be detected. Bolts 63 that have been inserted through a bracket 62 and the side member outer panel 24 are fastened to nuts 65, thereby attaching the object detection sensor 58 to a vehicle width direction inner face of the side member outer panel 24 through the bracket 62 (see FIG. 3; note that the rocker molding 26 is omitted from FIG. 3 in order to facilitate understanding of relevant portions).

Operation and Advantageous Effects of First Exemplary Embodiment

Explanation follows regarding operation and advantageous effects of the present exemplary embodiment.

As illustrated in FIG. 2, in the present exemplary embodiment, the object detection sensor 58 is disposed in the rocker section 18 extending along substantially the vehicle front-rear direction. Since the side member outer panel 24 and the rocker molding 26 disposed at the vehicle width direction outer side of the object detection sensor 58 are both made of resin, when the object detection sensor 58 detects an object at the vehicle exterior using electromagnetic waves or the like, reflection of the electromagnetic waves or the like by the side member outer panel 24 and the rocker molding 26 is suppressed. Namely, the object detection sensor 58 can be disposed in a required position from over a wide range in the vehicle front-rear direction along the rocker section 18, without detection of objects by the object detection sensor 58 being hindered by the side member outer panel 24 or the rocker molding 26. This enables the degrees of freedom of the position where the object detection sensor 58 is provided to be increased. This enables the object detection sensor 58 to be disposed in a more suitable position on the vehicle 10, and the degree of detection of objects at the vehicle exterior to be adjusted. Moreover, disposing the object detection sensor 58 in the rocker section 18 at the lower side of the vehicle side section enables objects at the vehicle width direction outer side and the vehicle lower side to be detected. This facilitates detection of vehicles traveling alongside the vehicle, the road shoulder, a median strip, road studs and markers embedded in the road surface, as well as road signs and the like.

Moreover, since the object detection sensor 58 is provided between the side member outer panel 24 and the rocker reinforcement panel 22, the object detection sensor 58 is protected from the vehicle exterior by the side member outer panel 24 and the rocker molding 26. This enables damage to the object detection sensor 58 due to foreign matter hitting the object detection sensor 58 to be suppressed.

Note that in the present exemplary embodiment, the object detection sensor 58 is attached to the side member outer panel 24 between the side member outer panel 24 and the rocker reinforcement panel 22; however, there is no limitation thereto. The object detection sensor 58 may be attached to a vehicle width direction outer face of the rocker reinforcement panel 22, or may be attached so as to span between the vehicle width direction inner face of the side member outer panel 24 and the vehicle width direction outer face of the rocker inner panel 20.

Modified Examples of First Exemplary Embodiment

Figure 4:
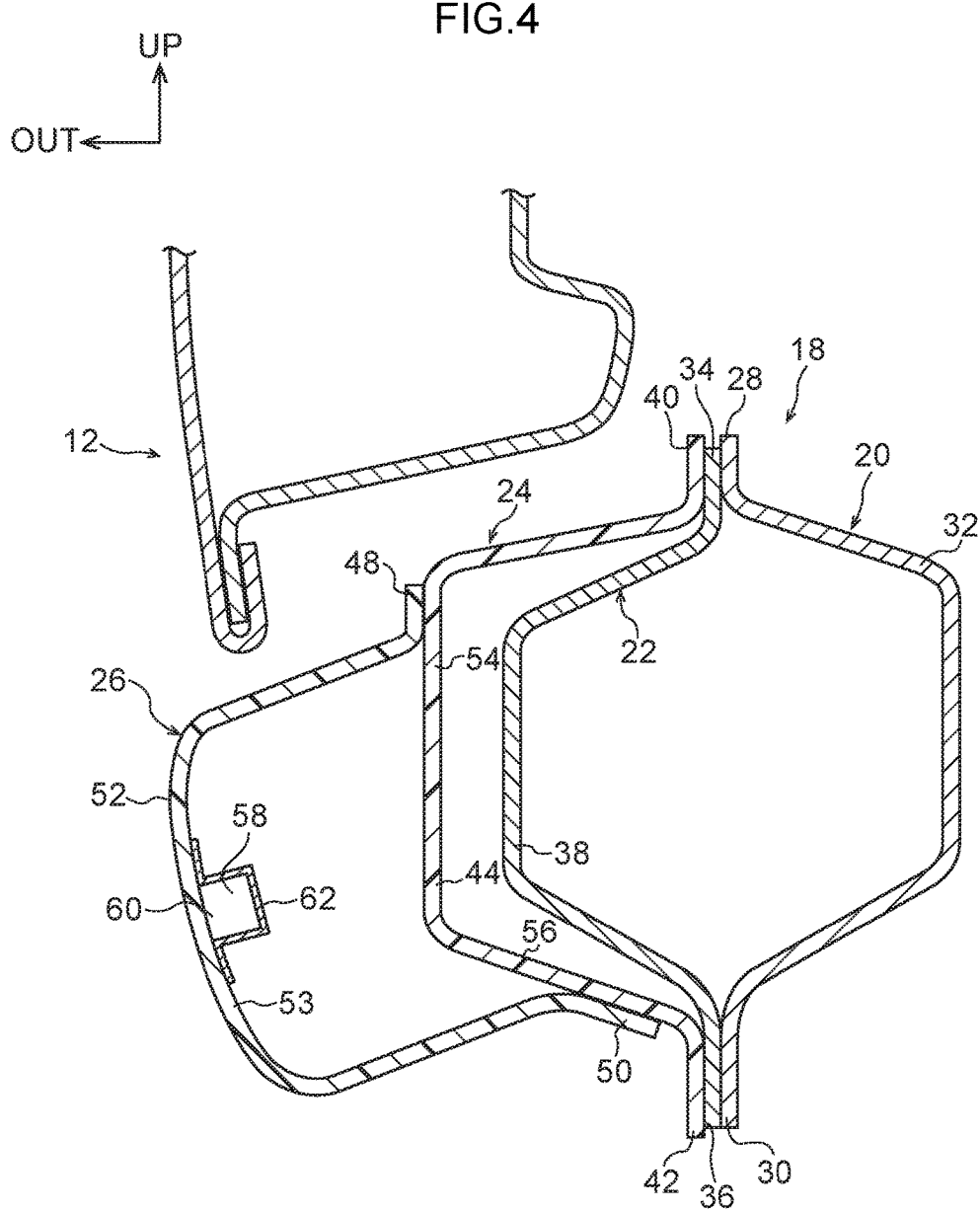
FIG. 4 is a vertical cross-section illustrating a vehicular object detection device according to a modified example of the first exemplary embodiment in a state viewed from the vehicle front.

In the first exemplary embodiment, the object detection sensor 58 is provided between the side member outer panel 24 and the rocker reinforcement panel 22; however, the first exemplary embodiment is not limited thereto. As illustrated in FIG. 4, for example, the object detection sensor 58 may be provided between the rocker molding 26 and the side member outer panel 24. In this modified example, the object detection sensor 58 is attached through the bracket 62 to a vehicle width direction inner face of a wall 53 extending along substantially the vehicle vertical direction at the intermediate portion 52 of the rocker molding 26.

Although not illustrated in the drawings, another modified example may be configured such that the object detection sensor 58 is attached to a vehicle width direction outer face of the side member outer panel 24. Furthermore, configuration is such that the rocker molding 26 is attached to the vehicle width direction outer side of the side member outer panel 24 in the rocker section 18; however, there is no limitation thereto. Configuration may be such that another component, such as a step, is attached thereto, and the object detection sensor 58 is attached to this other component.

Although the rocker reinforcement panel 22 is made of metal, there is no limitation thereto, and yet another modified example may be configured such that the rocker reinforcement panel 22 may be configured by a resin. Although not illustrated in the drawings, the object detection sensor 58 may be provided between the rocker reinforcement panel 22 and the rocker inner panel 20 in such cases.

Second Exemplary Embodiment

Figure 5:
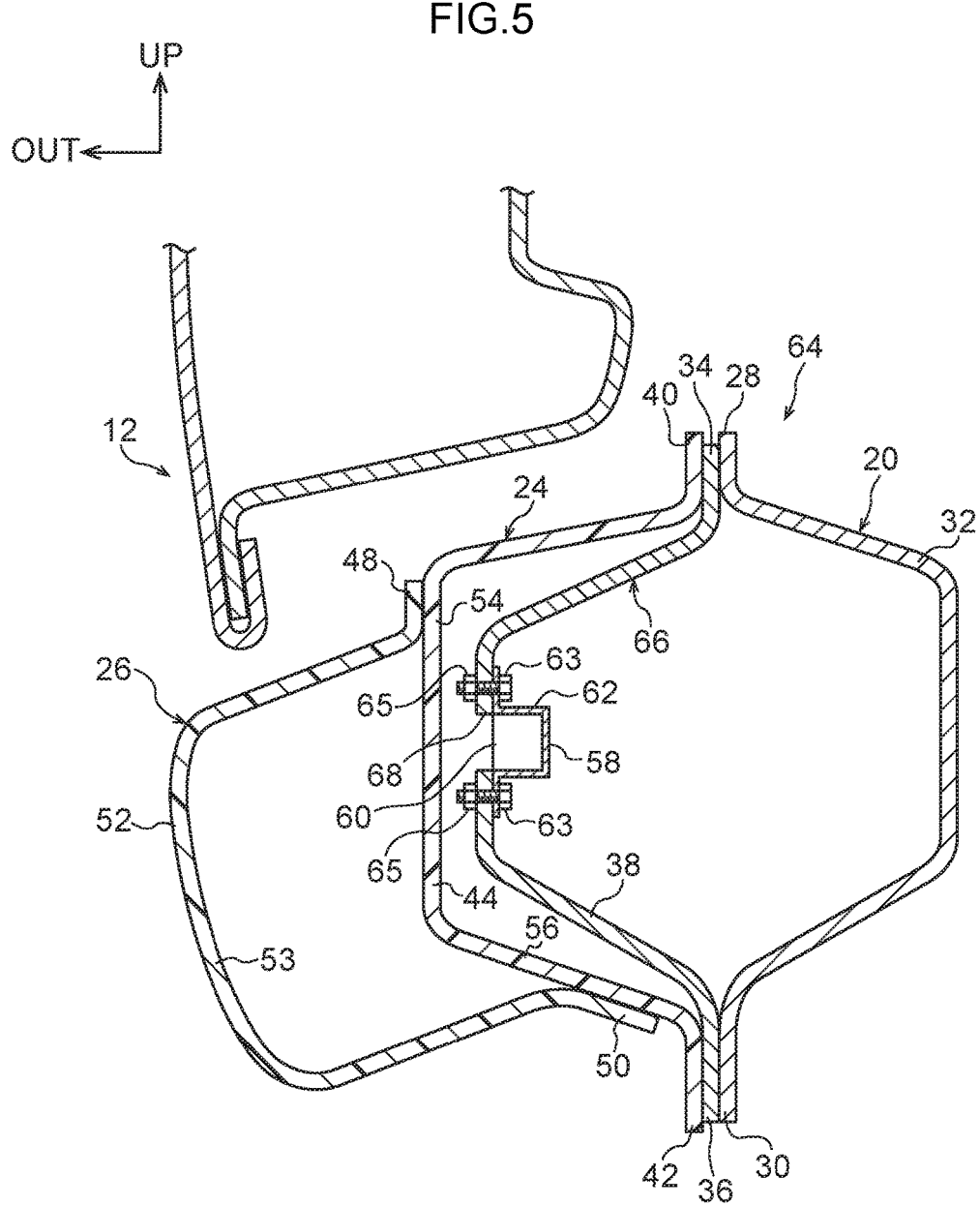
FIG. 5 is a vertical cross-section corresponding to FIG. 2, illustrating a vehicular object detection device according to a second exemplary embodiment in a state viewed from the vehicle front.
Figure 6:
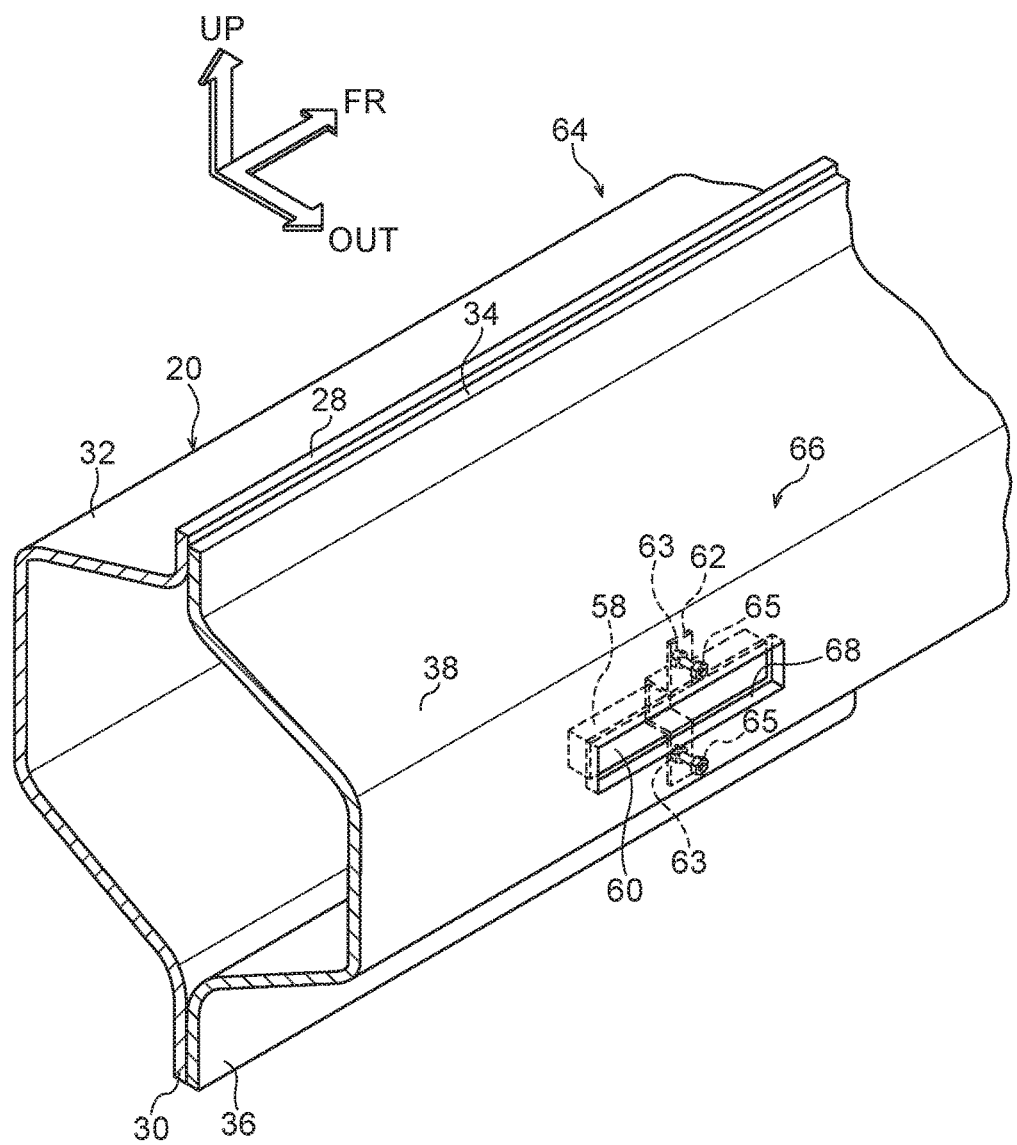
FIG. 6 is a perspective view illustrating a vehicular object detection device according to the second exemplary embodiment in an assembled state.
Figure 7:
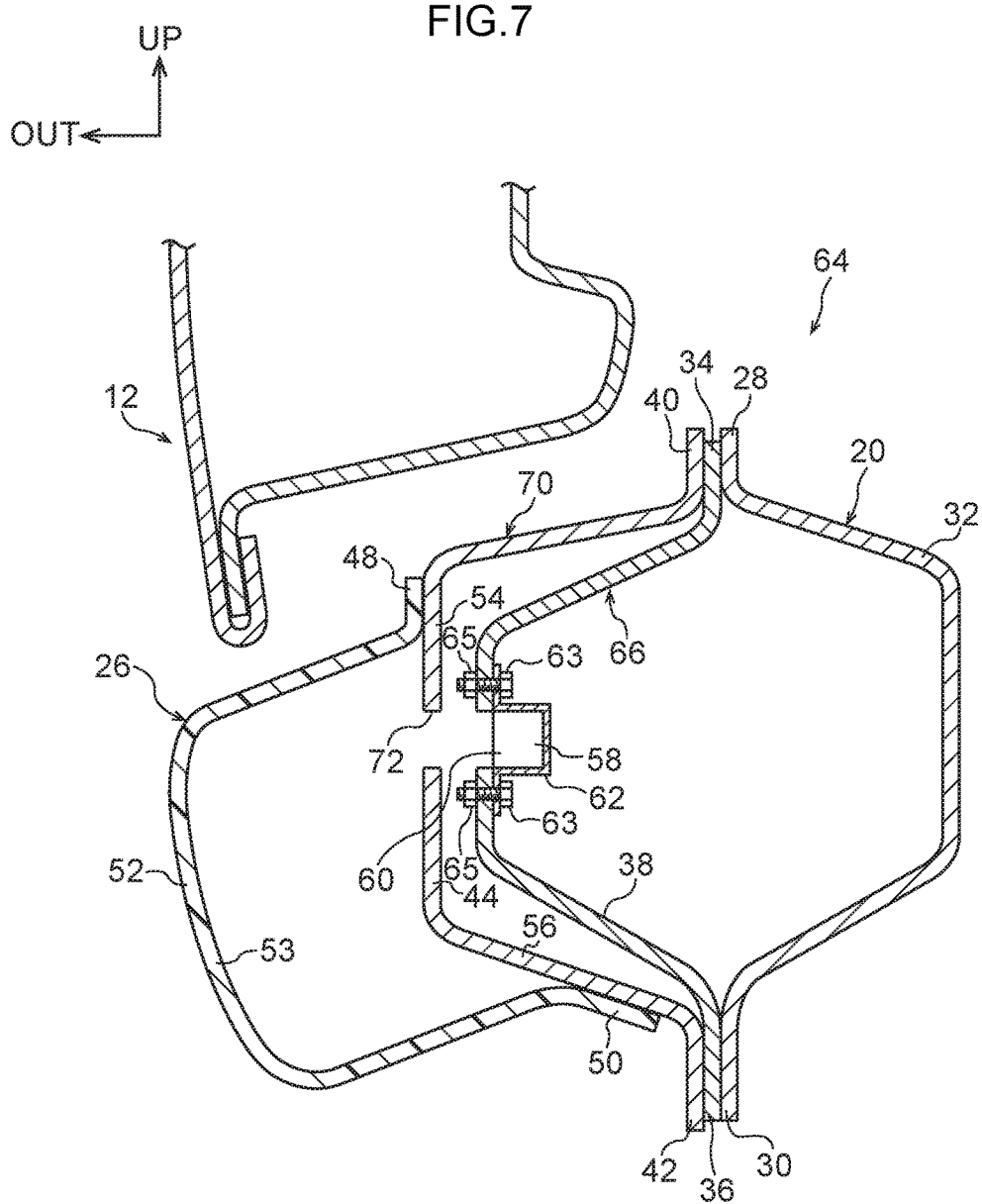
FIG. 7 is a vertical cross-section corresponding to FIG. 2, illustrating a vehicular object detection device according to a modified example of the second exemplary embodiment in a state viewed from the vehicle front.

Explanation follows regarding a vehicular object detection device according to a second exemplary embodiment of the present disclosure, with reference to FIGS. 5 to 7. Note that the same configuration portions as those in the above-described first exemplary embodiment are appended with the same reference numerals, and explanation thereof is omitted.

As illustrated in FIG. 5, the vehicular object detection device according to the second exemplary embodiment has basically the same configuration as the first exemplary embodiment, with features that the object detection sensor 58 is provided between a rocker reinforcement panel 66 and the rocker inner panel 20 of a rocker section 64, and that a detection opening 68 is formed in the rocker reinforcement panel 66 made of metal.

Namely, the object detection sensor 58 is provided between the rocker inner panel 20 and the rocker reinforcement panel 66. Specifically, the object detection sensor 58 is attached to a vehicle width direction inner face of the rocker reinforcement panel 66 through the bracket 62 by fastening bolts 63 that have been inserted through the bracket 62 and the rocker reinforcement panel 66 to nuts 65. The detection opening 68 is formed piercing through in the plate thickness direction (vehicle width direction) at a position of the rocker reinforcement panel 66 corresponding to the transceiver 60 of the object detection sensor 58, namely, at a location of the rocker reinforcement panel 66 at the vehicle width direction outer side of the object detection sensor 58 (see FIG. 6; note that the rocker molding 26 is omitted from FIG. 6 in order to facilitate understanding of relevant portions).

Operation and Advantageous Effects of Second Exemplary Embodiment

Explanation follows regarding operation and advantageous effects of the present exemplary embodiment.

The above configuration is similarly configured to the vehicular object detection device of the first exemplary embodiment, with the exception that the object detection sensor 58 is provided between the rocker reinforcement panel 66 and the rocker inner panel 20 and that the detection opening 68 is formed in the rocker reinforcement panel 66, and so similar advantageous effects to those in the first exemplary embodiment can be obtained. Namely, the side member outer panel 24 and the rocker molding 26 disposed at the vehicle width direction outer side of the object detection sensor 58 are each made of resin, and the detection opening 68 is formed in the rocker reinforcement panel 66 made of metal and similarly disposed at the vehicle width direction outer side of the object detection sensor 58. Thus, the object detection sensor 58 can be disposed in a required position from over a wide range in the vehicle front-rear direction along the rocker section 64, without detection of objects by the object detection sensor 58 being hindered by the rocker molding 26, the side member outer panel 24, and the rocker reinforcement panel 66. This enables the degrees of freedom of the position where the object detection sensor 58 is provided to be increased. This accordingly enables the object detection sensor 58 to be disposed in a more suitable position on the vehicle 10, and the degree of detection of objects at the vehicle exterior to be adjusted. Moreover, disposing the object detection sensor 58 in the rocker section 64 at the lower side of the vehicle side section enables objects at the vehicle width direction outer side and the vehicle lower side to be detected.

Moreover, since the object detection sensor 58 is disposed between the rocker reinforcement panel 66 and the rocker inner panel 20, the object detection sensor 58 is protected from the vehicle exterior by the rocker molding 26, the side member outer panel 24, and the rocker reinforcement panel 66. This enables damage to the object detection sensor 58 due to foreign matter hitting the object detection sensor 58 to be further suppressed.

Note that in the present exemplary embodiment, the object detection sensor 58 is attached to the vehicle width direction inner face of the rocker reinforcement panel 66 through the bracket 62; however, there is no limitation thereto, and the object detection sensor 58 may be attached to a vehicle width direction outer face of the rocker inner panel 20. The object detection sensor 58 may alternatively be attached so as to span between the vehicle width direction inner face of the rocker reinforcement panel 66 and the vehicle width direction outer face of the rocker inner panel 20.

Modified Examples of Second Exemplary Embodiment

Although the side member outer panel 24 is made of resin in the second exemplary embodiment, the second exemplary embodiment is not limited thereto. As illustrated in FIG. 7, for example, configuration may be such that a side member outer panel 70 is made of metal and a detection opening 72 is formed therein. In this modified example, the detection opening 72 is formed piercing through the side member outer panel 70 in the plate thickness direction at a position corresponding to the object detection sensor 58. Note that the detection opening 68 formed in the rocker reinforcement panel 66 and the detection opening 72 formed in the side member outer panel 70 are disposed in substantially the same position in a vehicle side-on view.

As other modified examples, in FIG. 5, the object detection sensor 58 may be disposed between the side member outer panel 24 and the rocker reinforcement panel 66, or between the rocker molding 26 and the side member outer panel 24. In cases in which the side member outer panel 24 or the rocker molding 26 disposed at the vehicle width direction outer side of the object detection sensor 58 are made of metal, a detection opening is formed in a position (preferably a position that least affects the external styling appearance) corresponding to the transceiver 60 of the object detection sensor 58 in the side member outer panel 24 or the rocker molding 26.

The detection opening 68 and the detection opening 72 are configured piercing through the rocker reinforcement panel 66 and the side member outer panel 70 in the plate thickness direction; however, there is no limitation thereto. Although not illustrated in the drawings, another modified example may be configured such that at least one from out of the detection opening 68 or the detection opening 72 is blocked by a lid formed of a member made, for example, of a resin that allows electromagnetic waves and ultrasound waves to pass through. Such cases enable electromagnetic waves or the like to be transmitted and received through the lid when the object detection sensor 58 is operating, and the object detection sensor 58 to be protected by the lid from foreign matter such as stones flying up while the vehicle is traveling. This enables damage to the object detection sensor 58 caused by foreign matter entering the detection opening 68 and the detection opening 72 to be suppressed.

Note that although the detection openings 68, 72 are openings formed oriented toward the vehicle width direction outer side, there is no limitation thereto, and the openings may be formed oriented toward substantially the vehicle lower side. In such cases, detection of objects and so on at the lower side of the vehicle 10 is further facilitated by disposing the transceiver 60 of the object detection sensor 58 so as to be aligned with the detection openings 68, 72 with their openings oriented toward substantially the vehicle lower side.

The rocker reinforcement panel 66 formed with the detection opening 68 in the second exemplary embodiment, and the side member outer panel 70 formed with the detection opening 72 in the modified example of the second exemplary embodiment are each made of metal; however, there is no limitation thereto, and each may be configured by a resin such as CFRP.

Third Exemplary Embodiment

Figure 8:
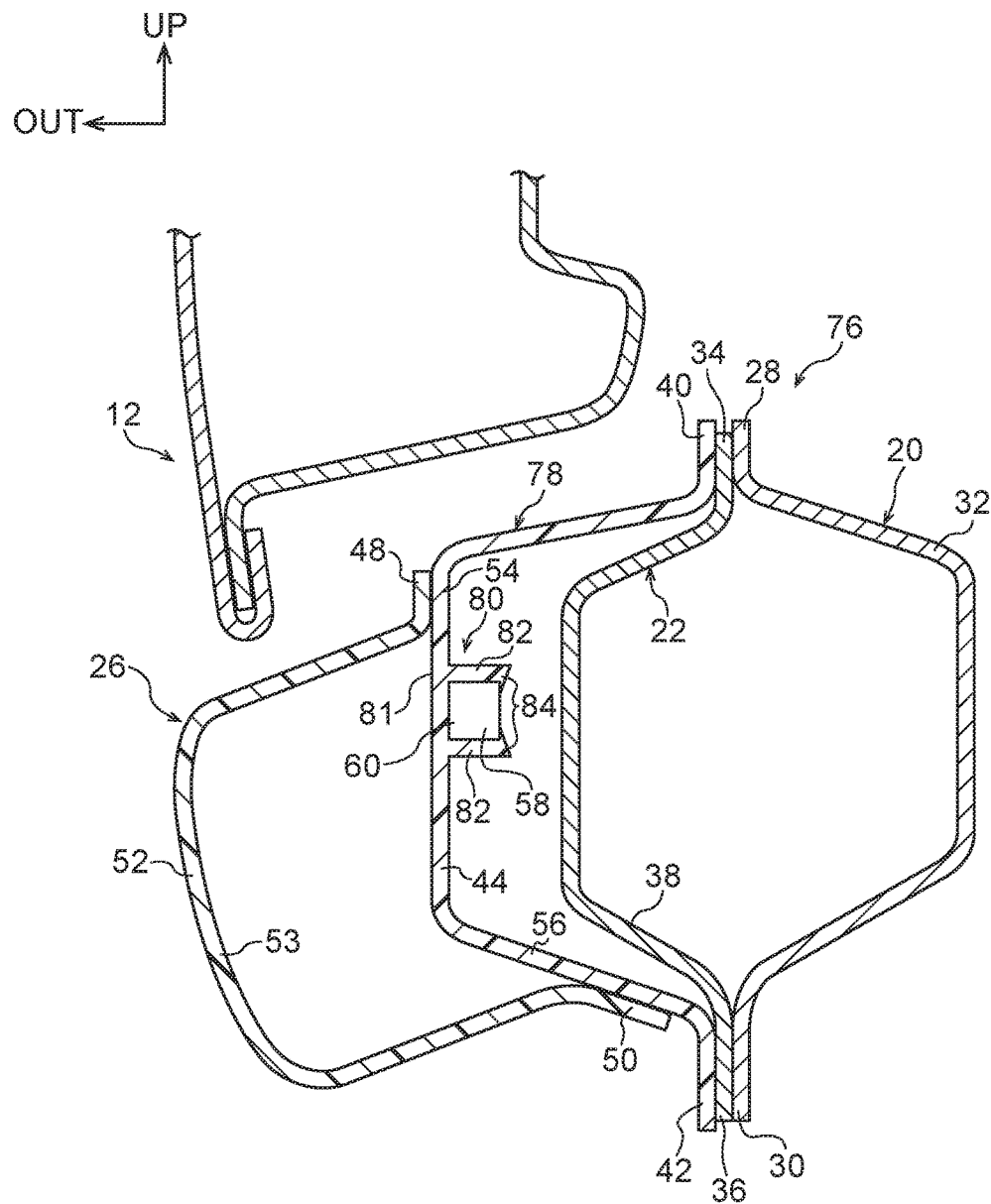
FIG. 8 is a vertical cross-section corresponding to FIG. 2, illustrating a vehicular object detection device according to a third exemplary embodiment in a state viewed from the vehicle front.
Figure 9:
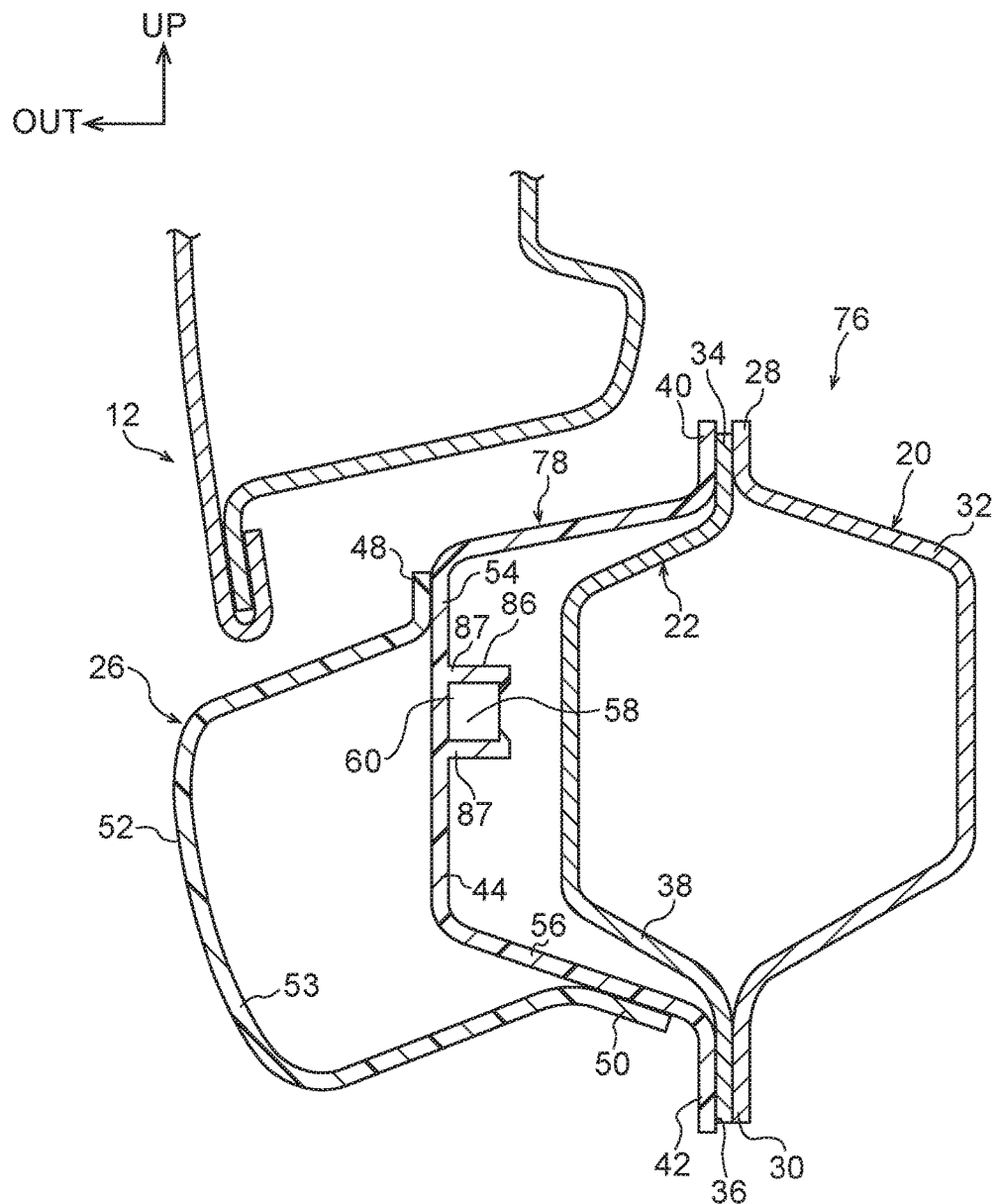
FIG. 9 is a vertical cross-section corresponding to FIG. 2, illustrating a vehicular object detection device according to a modified example of the third exemplary embodiment in a state viewed from the vehicle front.

Explanation follows regarding a vehicular object detection device according to a third exemplary embodiment of the present disclosure, with reference to FIGS. 8 and 9. Note that the same configuration portions as those in the above-described first exemplary embodiment and so on are appended with the same reference numerals, and explanation thereof is omitted.

As illustrated in FIG. 8, the vehicular object detection device according to the third exemplary embodiment has basically the same configuration as the first exemplary embodiment, with a feature that a holder 80 is formed to a side member outer panel 78 of a rocker section 76.

Namely, the holder 80 is formed to a vehicle width direction inner face of the side member outer panel 78. The holder 80 is integrally molded to the side member outer panel 78 configured by a resin, and is configured by a pair of claw-tabs 82 that are separated from each other in the vehicle vertical direction. The object detection sensor 58 is disposed inside the pair of claw-tabs 82. Retaining claws 84 are respectively formed so as to face each other at leading ends of the pair of claw-tabs 82, and the retaining claws 84 abut a vehicle width direction inner face of the object detection sensor 58. The object detection sensor 58 is thereby retained by the side member outer panel 78. Note that the holder 80 is provided in a position overlapping the rocker molding 26 in a vehicle side-on view. In other words, the rocker molding 26 is provided at the vehicle width direction outer side of the holder 80.

Operation and Advantageous Effects of Third Exemplary Embodiment

Explanation follows regarding operation and advantageous effects of the present exemplary embodiment.

The above configuration is also similarly configured to the vehicular object detection device of the first exemplary embodiment, with the exception that the holder 80 is formed to the side member outer panel 78, and so similar advantageous effects to those in the first exemplary embodiment can be obtained. Namely, the side member outer panel 78 and the rocker molding 26 disposed at the vehicle width direction outer side of the object detection sensor 58 are each made of resin, thereby enabling the object detection sensor 58 to be disposed in a required position from over a wide range in the vehicle front-rear direction along the rocker section 76, without detection of objects by the object detection sensor 58 being hindered by the side member outer panel 78 and the rocker molding 26. This enables the degrees of freedom of the position where the object detection sensor 58 is provided to be increased. This accordingly enables the object detection sensor 58 to be disposed in a more suitable position on the vehicle 10, and the degree of detection of objects at the vehicle exterior to be adjusted. Moreover, disposing the object detection sensor 58 in the rocker section 76 at the lower side of the vehicle side section enables objects at the vehicle width direction outer side and the vehicle lower side to be detected.

Furthermore, the holder 80 that retains the object detection sensor 58 is integrally molded to the side member outer panel 78 that is adjacent to the object detection sensor 58 in the vehicle width direction, thereby facilitating the positioning and attachment operation when attaching the object detection sensor 58 to the side member outer panel 78. This enables the ease of the attachment operation of the object detection sensor 58 to the rocker section 76 to be increased.

The rocker molding 26 is provided at the vehicle width direction outer side of a holder forming location 81 of the side member outer panel 78 where the holder 80 is integrally molded. Namely, the holder forming location 81 is covered by the rocker molding 26, such that, even if sink marks occur on a vehicle width direction outer face of the side member outer panel 78 when the holder 80 is integrally molded to the side member outer panel 78, these sinks marks are not visible from outside the vehicle 10. This accordingly enables a reduction in the quality of the external appearance of the vehicle side section to be suppressed.

Modified Examples of Third Exemplary Embodiment

Although the holder 80 is formed to the side member outer panel 78 in the third exemplary embodiment, the third exemplary embodiment is not limited thereto. For example, although not illustrated in the drawings, the rocker reinforcement panel 22 may be configured by a resin and a holder integrally molded thereto, or a holder may be integrally molded to the rocker molding 26 made of resin.

As illustrated in FIG. 9, another modified example may be configured such that respective vehicle width direction outer ends 87 of a holder 86 formed in a substantially U shape in a vehicle front view are integrally joined to the side member outer panel 78, and the object detection sensor 58 is inserted into and retained within an internal space formed by the holder 86 and the side member outer panel 78.

Configuration is such that the rocker molding 26 is provided at the vehicle width direction outer side of the holder 80, 86; however, there is no limitation thereto. Although not illustrated in the drawings, configuration may be such that the rocker molding 26 or another rocker configuration member does not overlap at the vehicle width direction outer side of the holder 80, 86.

Although not illustrated in the drawings, configuration may also be such that a detection opening is formed in another rocker configuration member provided at the vehicle width direction outer side of the holder 80, 86, in a position corresponding to the holder 80, 86.

Fourth Exemplary Embodiment

Figure 10:
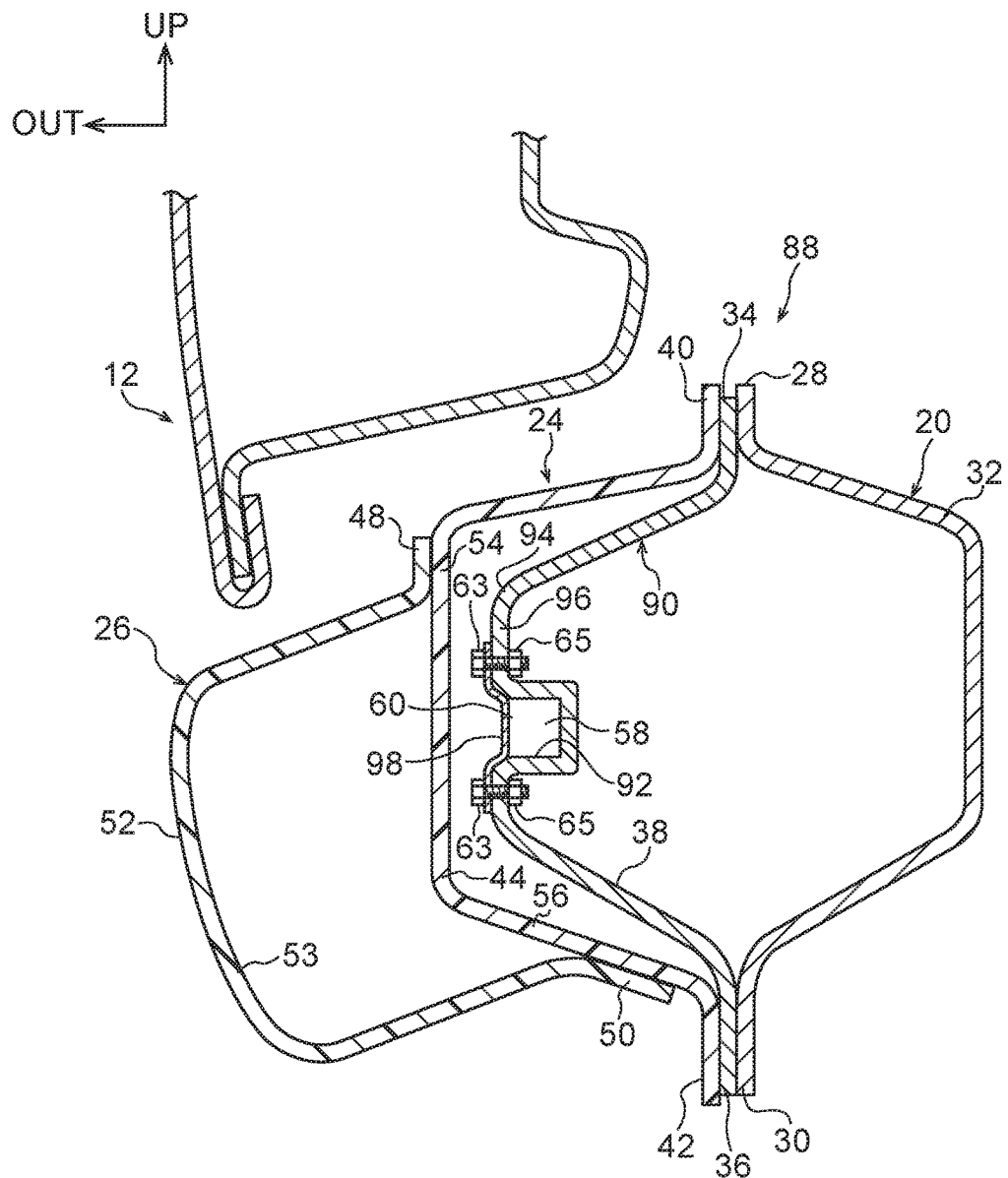
FIG. 10 is a vertical cross-section corresponding to FIG. 2, illustrating a vehicular object detection device according to a fourth exemplary embodiment in a state viewed from the vehicle front.
Figure 11:
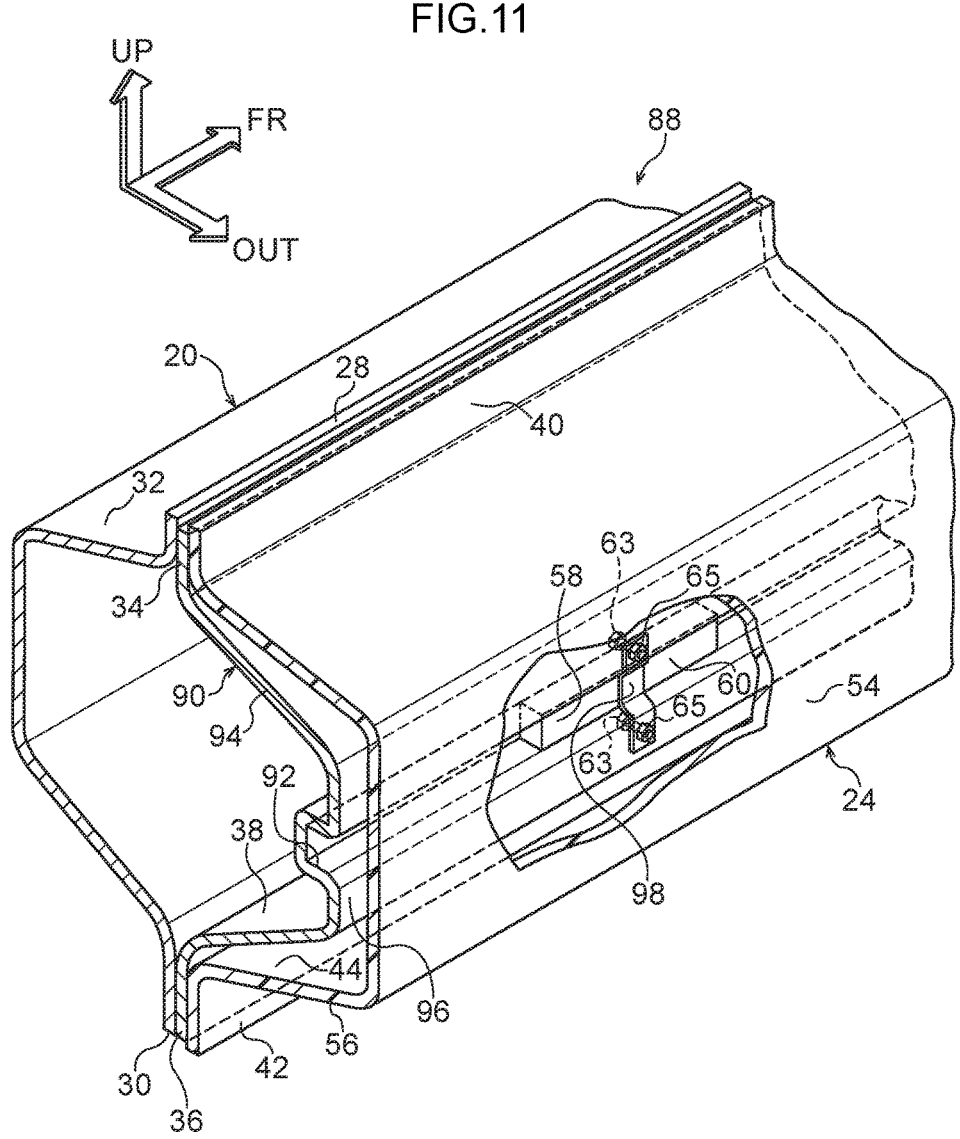
FIG. 11 is a perspective view illustrating a vehicular object detection device according to the fourth exemplary embodiment in an assembled state.

Explanation follows regarding a vehicular object detection device according to a fourth exemplary embodiment of the present disclosure, with reference to FIGS. 10 and 11.

Note that the same configuration portions as those in the above-described first exemplary embodiment and so on are appended with the same reference numerals, and explanation thereof is omitted.

As illustrated in FIG. 10, the vehicular object detection device according to the fourth exemplary embodiment has basically the same configuration as the first exemplary embodiment, with a feature that a recess 92 is formed in a rocker reinforcement panel 90 of a rocker section 88.

Namely, the recess 92 is formed in substantially the vehicle vertical direction center of a wall 96 extending along the vehicle vertical direction to an intermediate portion 94 of the rocker reinforcement panel 90 made of metal. The recess 92 is formed so as be indented toward the vehicle width direction inner side, and extends along the vehicle front-rear direction. The object detection sensor 58 is housed inside the recess 92. Specifically, the entire object detection sensor 58 is contained inside the recess 92 such that the object detection sensor 58 does not project out from an outer face of the wall 96 toward the vehicle width direction outer side, and nuts 65 are fastened to bolts 63 that have been inserted through a bracket 98 formed with a hat-shaped cross-section using a belt shaped plate member and through the rocker reinforcement panel 90, thereby retaining the object detection sensor 58 inside the recess 92 through the bracket 98 (see FIG. 11). A vehicle vertical direction dimension of the recess 92 is substantially the same as a vehicle vertical direction dimension of the object detection sensor 58. Thus, movement in the vehicle vertical direction of the object detection sensor 58 contained inside the recess 92 is limited. Note that although the rocker reinforcement panel 90 is made of metal in the present exemplary embodiment, there is no limitation thereto, and the rocker reinforcement panel 90 may be configured by another member made or resin or the like.

Operation and Advantageous Effects of Fourth Exemplary Embodiment

Explanation follows regarding operation and advantageous effects of the present exemplary embodiment.

The above configuration is also similarly configured to the vehicular object detection device of the first exemplary embodiment, with the exception that the recess 92 is formed in the rocker reinforcement panel 90, and so similar advantageous effects to those in the first exemplary embodiment can be obtained. Namely, the side member outer panel 24 and the rocker molding 26 disposed at the vehicle width direction outer side of the object detection sensor 58 are each made of resin, thereby enabling the object detection sensor 58 to be disposed in a required position from over a wide range in the vehicle front-rear direction along the rocker section 88, without detection of objects by the object detection sensor 58 being hindered by the side member outer panel 24 or the rocker molding 26. This enables the degrees of freedom of the position where the object detection sensor 58 is provided to be increased. This accordingly enables the object detection sensor 58 to be disposed in a more suitable position on the vehicle 10, and the degree of detection of objects at the vehicle exterior to be adjusted. Moreover, disposing the object detection sensor 58 in the rocker section 88 at the lower side of the vehicle side section enables objects at the vehicle width direction outer side and the vehicle lower side to be detected.

Furthermore, the recess 92 that limits vehicle vertical direction movement of the object detection sensor 58 is formed in the rocker reinforcement panel 90 that is adjacent to the object detection sensor 58, thereby enabling the object detection sensor 58 to be more reliably fixed in a pre-set position. Namely, this enables misalignment of the detection range due to positional misalignment of the object detection sensor 58 to be suppressed. This accordingly enables the detection precision of the object detection sensor 58 to be improved.

Since the entire object detection sensor 58 is contained inside the recess 92, collision load during a vehicle side collision is less liable to be directly transmitted to the object detection sensor 58. This accordingly enables damage to the object detection sensor 58 during a vehicle side collision to be suppressed.

Modified Examples of Fourth Exemplary Embodiment

Although the recess 92 is provided in the rocker reinforcement panel 90 in the fourth exemplary embodiment, the fourth exemplary embodiment is not limited thereto. For example, although not illustrated in the drawings, configuration may be such that the object detection sensor 58 is provided between the rocker reinforcement panel 90 and the rocker inner panel 20, a recess that is indented toward the vehicle width direction outer side is formed in a vehicle width direction inner face of the rocker reinforcement panel 90, and the object detection sensor 58 is contained within this recess. Although not illustrated in the drawings, yet another modified example may be configured such that a recess that is indented toward the vehicle width direction inner side is formed in the vehicle width direction outer face of the rocker inner panel 20, and the object detection sensor 58 is contained within this recess. Note that for each of the modified examples, it is preferable that at least a location of the rocker reinforcement panel 90 corresponding to the transceiver 60 of the object detection sensor 58 is provided with a detection opening, or is made of resin. In cases in which a detection opening is formed, the detection opening may be configured so as to be blocked by a lid configured by a resin.

Although not illustrated in the drawings, yet another modified example may be configured such that the object detection sensor 58 is provided between the side member outer panel 24 and the rocker reinforcement panel 90, a recess that is indented toward the vehicle width direction outer side is formed in the vehicle width direction inner face of the side member outer panel 24, and at least part of the object detection sensor 58 is contained within this recess.

Although not illustrated in the drawings, yet another modified example may be configured such that the object detection sensor 58 is provided between the rocker molding 26 and the side member outer panel 24, a recess that is indented toward the vehicle width direction outer side is formed in the vehicle width direction inner face of the rocker molding 26, and the object detection sensor 58 is contained within this recess. Although not illustrated in the drawings, yet another modified example may be configured such that a recess that is indented toward the vehicle width direction inner side is formed in the vehicle width direction outer face of the side member outer panel 24, and the object detection sensor 58 is contained within this recess.

Note that configuration is such that the entire object detection sensor 58 is contained inside the recess 92 in the above-described fourth exemplary embodiment and inside the recess in the modified examples of the fourth exemplary embodiment; however, there is no limitation thereto. Although not illustrated in the drawings, configuration may be such that at least part of the object detection sensor 58, such as a vehicle width direction inner end thereof, is disposed inside the recess 92 in the fourth exemplary embodiment or inside the recess in the modified examples.

Configuration may be such that a detection opening is formed in another rocker configuration member disposed at the vehicle width direction outer side of the recess, in a position corresponding to the recess.

The object detection sensor 58, at least part of which is disposed inside the recess, is fixed to the rocker section 88 through the bracket 98; however, there is no limitation thereto. Configuration may be such that the object detection sensor 58 is fixed to the rocker section 88 by a holder formed to a rocker configuration member, similarly to the holders 80, 86 of the above-described third exemplary embodiment.

Fifth Exemplary Embodiment

Figure 12:
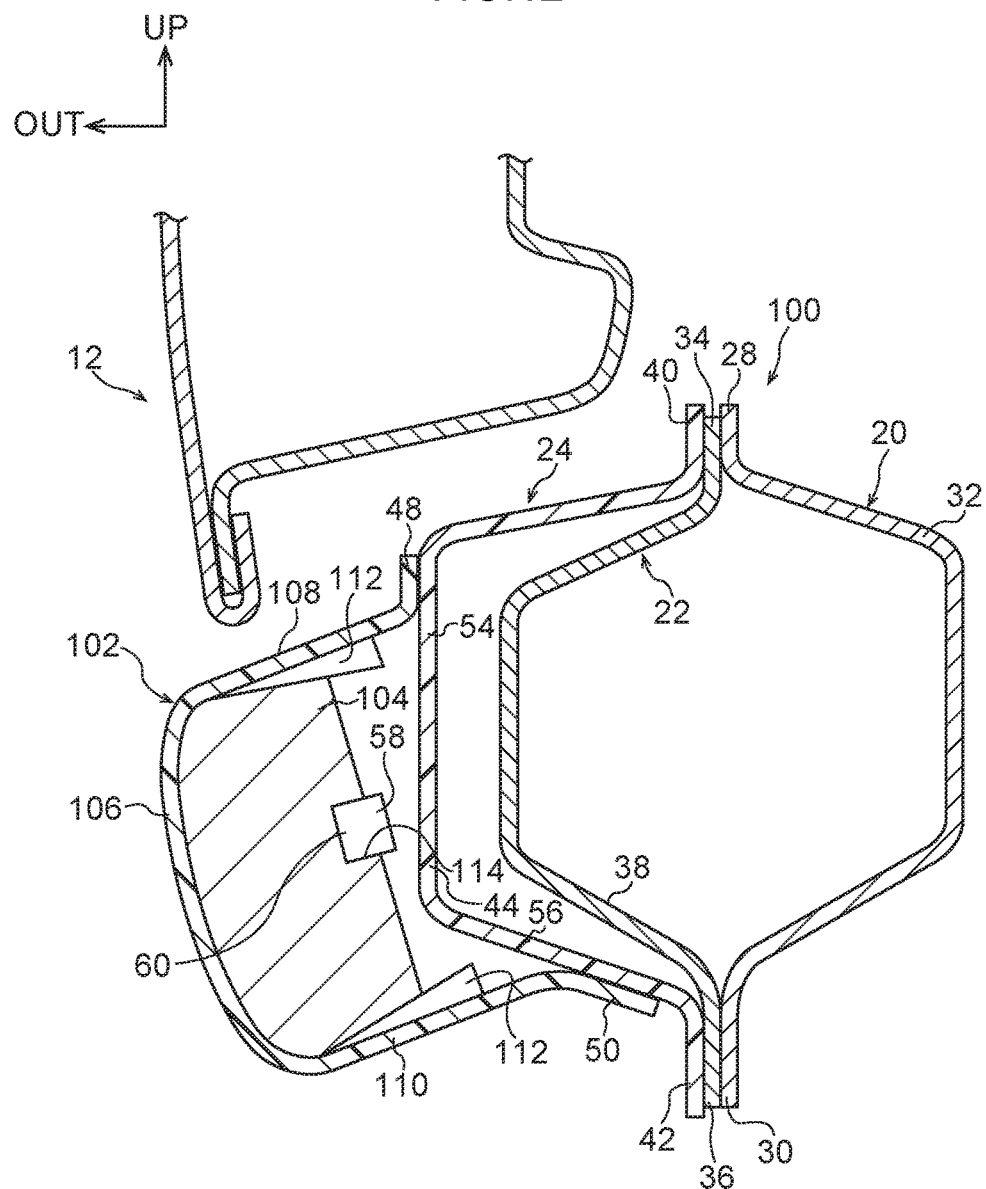
FIG. 12 is a vertical cross-section corresponding to FIG. 2, illustrating a vehicular object detection device according to a fifth exemplary embodiment in a state viewed from the vehicle front.

Explanation follows regarding a vehicular object detection device according to a fifth exemplary embodiment of the present disclosure, with reference to FIG. 12. Note that the same configuration portions as those in the above-described first exemplary embodiment are appended with the same reference numerals, and explanation thereof is omitted.

As illustrated in FIG. 12, the vehicular object detection device according to the fifth exemplary embodiment has basically the same configuration as the first exemplary embodiment, with a feature that the object detection sensor 58 is attached to a rocker molding 102 of a rocker section 100 through a shock-absorbing member 104.

Namely, the shock-absorbing member 104 is attached to the rocker molding 102. The shock-absorbing member 104 is configured by a foamed resin, and its external profile at the vehicle upper side, vehicle lower side, and vehicle width direction outer side is substantially the same as the profile at the respective vehicle upper side, vehicle lower side, and vehicle width direction outer side of a vehicle width direction inner face of the rocker molding 102.

Upper and lower pairs of ribs 112 are formed to a wall 108 at the vehicle upper side and a wall 110 at the vehicle lower side of an intermediate portion 106 of the rocker molding 102. The ribs 112 are each formed in a triangular shape in a vehicle front view, and are integrally formed to the rocker molding 102. The ribs 112 are respectively formed at both vehicle front-rear direction ends of the rocker molding 102, such that movement of the shock-absorbing member 104 in the vehicle front-rear direction is restricted, and the shock-absorbing member 104 is positioned accordingly.

A shock-absorbing member-side holder 114 is formed in a substantially U shape in a vehicle front view in a vehicle width direction inner face of the shock-absorbing member 104. The shock-absorbing member-side holder 114 has substantially the same shape as an outer profile of the object detection sensor 58 and is set with a slightly smaller size than the object detection sensor 58. The object detection sensor 58 is fixed to the shock-absorbing member 104, and therefore to the rocker molding 102, in a state fitted inside the shock-absorbing member-side holder 114.

Operation and Advantageous Effects of Fifth Exemplary Embodiment

Explanation follows regarding operation and advantageous effects of the present exemplary embodiment.

The above configuration is also similarly configured to the vehicular object detection device of the first exemplary embodiment, with the exception that the object detection sensor 58 is attached to the rocker molding 102 through the shock-absorbing member 104, and so similar advantageous effects to those in the first exemplary embodiment can be obtained. Namely, the rocker molding 102 and the shock-absorbing member 104 disposed at the vehicle width direction outer side of the object detection sensor 58 are each made of resin or foamed resin, thereby enabling the object detection sensor 58 to be disposed in a required position from over a wide range in the vehicle front-rear direction along the rocker section 100, without detection of objects by the object detection sensor 58 being hindered by the rocker molding 102 or the shock-absorbing member 104. This enables the degrees of freedom of the position where the object detection sensor 58 is provided to be increased. This accordingly enables the object detection sensor 58 to be disposed in a more suitable position on the vehicle 10, and the degree of detection of objects at the vehicle exterior to be adjusted. Moreover, disposing the object detection sensor 58 in the rocker section 100 at the lower side of the vehicle side section enables objects at the vehicle width direction outer side and the vehicle lower side to be detected.

Moreover, the object detection sensor 58 is retained by the shock-absorbing member-side holder 114 formed at the vehicle width direction inner side of the shock-absorbing member 104. The object detection sensor 58 is attached to the rocker molding 102 through the shock-absorbing member 104, such that collision load input to the rocker molding 102 during a vehicle side collision is transmitted to the object detection sensor 58 through the shock-absorbing member 104. Namely, this enables the collision load to be absorbed by the shock-absorbing member 104, and enables direct input of collision load to the object detection sensor 58 to be suppressed by the shock-absorbing member 104. This enables damage to the object detection sensor 58 in a vehicle side collision to be suppressed.

Modified Examples of Fifth Exemplary Embodiment

Although the shock-absorbing member 104 is provided to the rocker molding 102 in the fifth exemplary embodiment, the fifth exemplary embodiment is not limited thereto. For example, although not illustrated in the drawings, configuration may be such that the shock-absorbing member 104 is attached to a vehicle width direction inner face of the rocker reinforcement panel 22, or such that the shock-absorbing member 104 is attached to a vehicle width direction inner face of the side member outer panel 24.

Configuration may also be such that a detection opening that is open toward substantially the vehicle width direction outer side in a position corresponding to the object detection sensor 58 is formed in at least one out of a rocker configuration member to which the shock-absorbing member 104 is attached, or another rocker configuration member disposed at the vehicle width direction outer side of this rocker configuration member.

Although the object detection sensor 58 is configured retained by the shock-absorbing member-side holder 114 of the shock-absorbing member 104, there is no limitation thereto. Configuration may be such that at least part of the object detection sensor 58 is retained by a holder that is integrally molded to a rocker configuration member, similarly to the holders 80, 86 of the above-described third exemplary embodiment.

Furthermore, configuration may be such that vehicle vertical direction movement of the object detection sensor 58 is limited by inserting the object detection sensor 58 retained by the shock-absorbing member-side holder 114 of the shock-absorbing member 104 into a recess formed in a rocker configuration member disposed at the vehicle width direction inner side of the object detection sensor 58, similarly to the recess 92 of the above-described fourth exemplary embodiment.

Sixth Exemplary Embodiment

Explanation follows regarding a vehicular object detection device according to a sixth exemplary embodiment of the present disclosure, with reference to FIGS. 13A, 13B and FIGS. 14A, 14B. Note that the same configuration portions as those in the above-described first exemplary embodiment are appended with the same reference numerals, and explanation thereof is omitted.

Figure 13A:
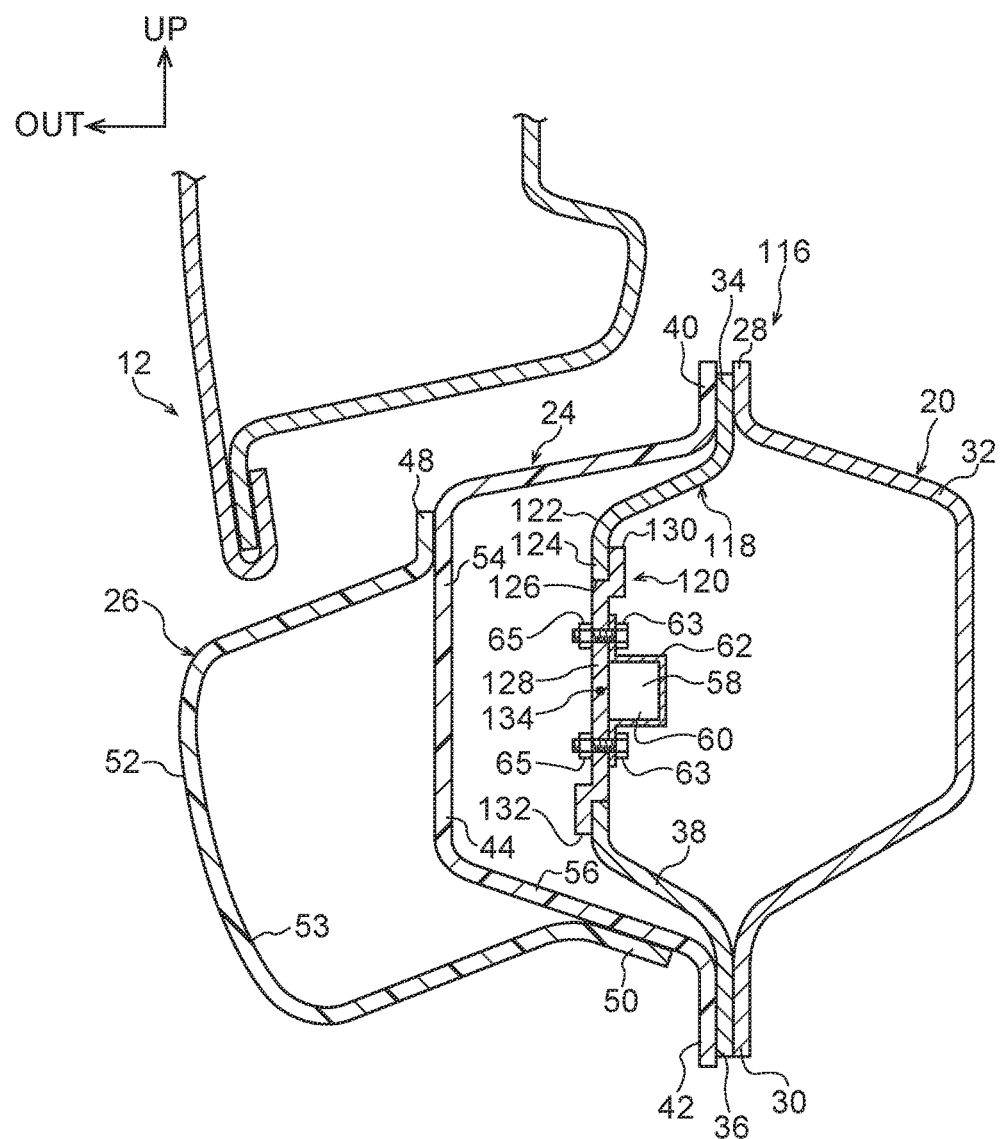
FIG. 13A is a vertical cross-section corresponding to FIG. 2, illustrating a vehicular object detection device according to a sixth exemplary embodiment in a state viewed from the vehicle front.

As illustrated in FIG. 13A, the vehicular object detection device according to the sixth exemplary embodiment has basically the same configuration as the first exemplary embodiment, with a feature that a movable lid 120 is provided to a rocker reinforcement panel 118 of a rocker section 116.

Namely, a detection opening 126 that pierces through in the plate thickness direction is formed in a wall 124 extending along the vehicle vertical direction at an intermediate portion 122 of the rocker reinforcement panel 118.

The movable lid 120 that blocks the detection opening 126 is provided to the rocker reinforcement panel 118. The movable lid 120 includes a lid body 128 formed with substantially the same shape as the detection opening 126 and a slightly smaller size than the detection opening 126, a lid upper flange 130 provided at the vehicle width direction inner side of an upper end of the lid body 128, and a lid lower flange 132 provided at the vehicle width direction outer side of a lower end of the lid body 128. A shaft 134 is provided running along substantially the vehicle front-rear direction at substantially the vehicle vertical direction center of the lid body 128, and a non-illustrated drive means is connected to the movable lid 120. The drive means is operated to rotate the movable lid 120 about the shaft 134, such that the detection opening 126 is capable of being opened or closed (see FIG. 13B also).

A vehicle width direction outer face of the lid upper flange 130 abuts a vehicle width direction inner face of the wall 124 in a state in which the lid body 128 runs parallel to the wall 124 of the rocker reinforcement panel 118. A vehicle width direction inner face of the lid lower flange 132 also abuts a vehicle width direction outer face of the wall 124 in a state in which the lid body 128 runs parallel to the wall 124 of the rocker reinforcement panel 118.

Figure 13B:
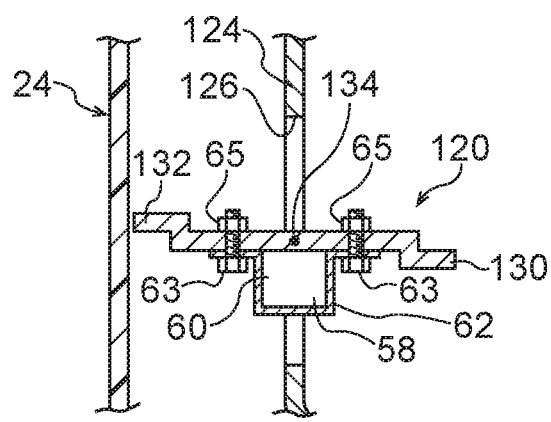
FIG. 13B is a vertical cross-section illustrating a state in which a lid has rotated with respect to FIG. 13A.

The object detection sensor 58 is attached to a vehicle width direction inner face of the movable lid 120. The object detection sensor 58 is attached through the bracket 62 to the vehicle width direction inner face of the lid body 128 at a position corresponding to the shaft 134. The bracket 62 is attached to the movable lid 120 by fastening nuts 65 to bolts 63 that have been inserted through the bracket 62 and the movable lid 120. The object detection sensor 58 that is attached to the movable lid 120 is attached thereto with the transceiver 60 of the object detection sensor 58 oriented toward the vehicle lower side in a state in which that movable lid 120 has closed the detection opening 126. Namely, as illustrated in FIG. 13B, configuration is such that the transceiver 60 of the object detection sensor 58 moves toward the vehicle width direction outer side in a state in which the movable lid 120 has opened the detection opening 126. Thus, when the object detection sensor 58 is actuated, the movable lid 120 is rotated by the drive means to open the detection opening 126, and when the object detection sensor 58 is not actuated, the movable lid 120 is rotated by the drive means to close the detection opening 126.

Operation and Advantageous Effects of Sixth Exemplary Embodiment

Explanation follows regarding operation and advantageous effects of the present exemplary embodiment.

The above configuration is also similarly configured to the vehicular object detection device of the first exemplary embodiment, with the exception that the movable lid 120 is provided to the rocker reinforcement panel 118, and so similar advantageous effects to those in the first exemplary embodiment can be obtained. Namely, the side member outer panel 24 and the rocker molding 26 disposed at the vehicle width direction outer side of the object detection sensor 58 are each made of resin and the detection opening 126 is formed in the rocker reinforcement panel 118, thereby enabling the object detection sensor 58 to be disposed in a required position from over a wide range in the vehicle front-rear direction along the rocker section 116, without detection of objects by the object detection sensor 58 being hindered by the side member outer panel 24, the rocker molding 26, and the rocker reinforcement panel 118. This enables the degrees of freedom of the position where the object detection sensor 58 is provided to be increased. This accordingly enables the object detection sensor 58 to be disposed in a more suitable position on the vehicle 10, and the degree of detection of objects at the vehicle exterior to be adjusted. Moreover, disposing the object detection sensor 58 in the rocker section 116 at the lower side of the vehicle side section enables objects at the vehicle width direction outer side and the vehicle lower side to be detected.

The object detection sensor 58 is actuated when the vehicle 10 is in an automated driving mode with a high degree of dependency on the object detection sensor 58. The detection opening 126 is opened by the movable lid 120 when this is performed. The detection opening 126 can be closed by the movable lid 120 when the object detection sensor 58 is not operating. This enables electromagnetic waves or the like to be transmitted and received through the detection opening 126 when the object detection sensor 58 is operating. When the object detection sensor 58 is not operating, the object detection sensor 58 can be protected by the side member outer panel 24, the rocker reinforcement panel 118, and the movable lid 120. This enables damage to the object detection sensor 58 when the object detection sensor 58 is not operating, occurring due to foreign matter entering the detection opening 126 when the object detection sensor 58 is not operating, to be suppressed in cases in which the detection opening 126 is provided to the rocker reinforcement panel 118. Note that the detection opening 126 may also be opened by the movable lid 120 in cases in which the object detection sensor 58 is actuated in states other than when the vehicle 10 is in an automated driving mode.

Moreover, the detection opening 126 can be closed by the movable lid 120 when the object detection sensor 58 is not operating. This enables a reduction in bending rigidity and twisting rigidity due to the detection opening 126 being formed to the rocker reinforcement panel 118 to be suppressed by the movable lid 120.

Modified Examples of Sixth Exemplary Embodiment

Figure 14A:
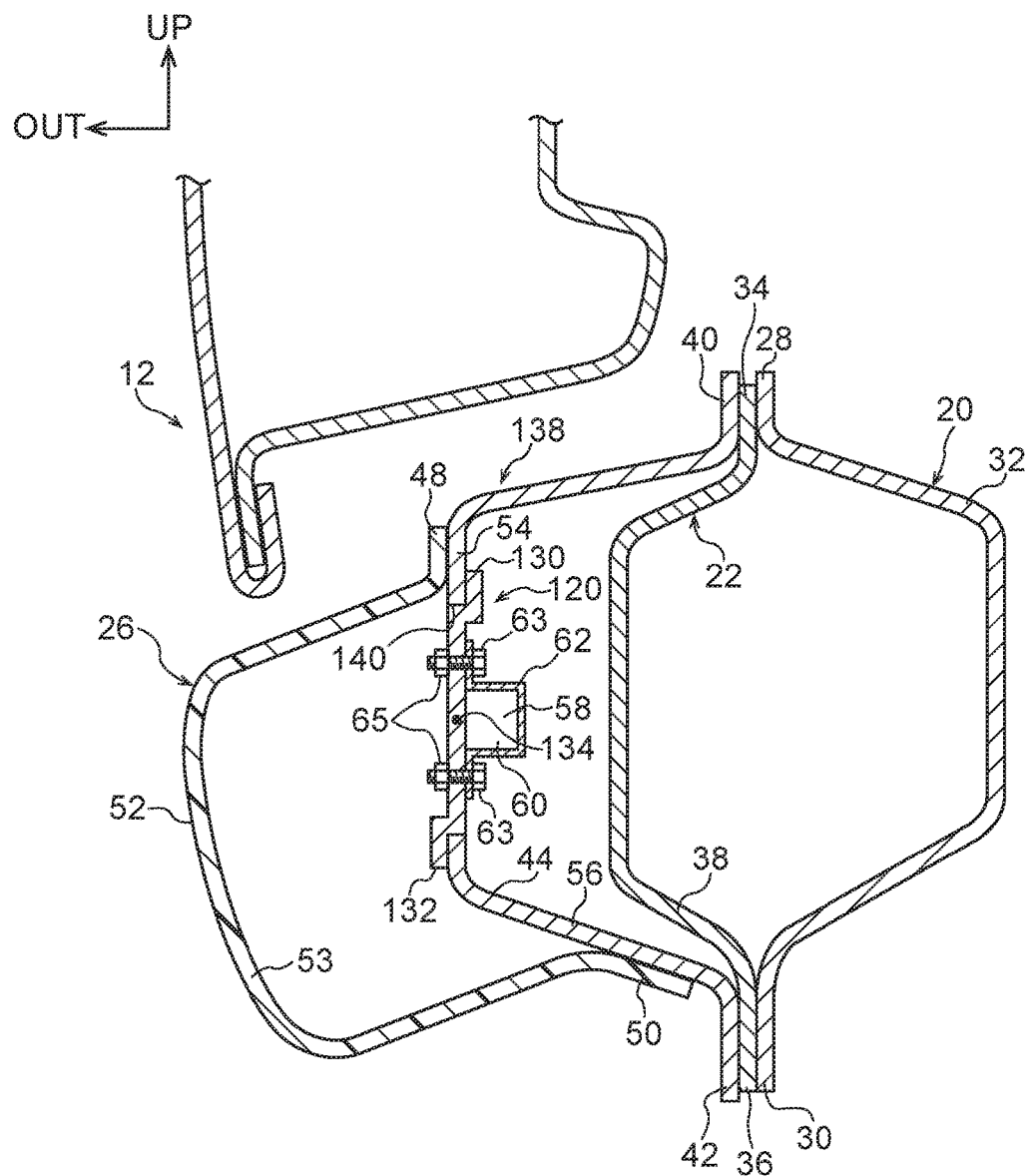
FIG. 14A is a vertical cross-section corresponding to FIG. 13A, illustrating a vehicular object detection device according to a modified example of the sixth exemplary embodiment in a state viewed from the vehicle front.
Figure 14B:
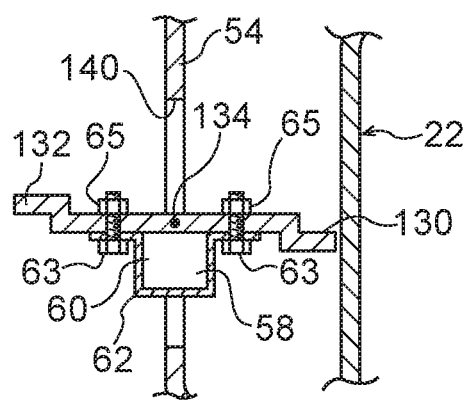
FIG. 14B is a lateral cross-section illustrating a state in which a lid has rotated with respect to FIG. 14A.

Although the movable lid 120 is provided to the rocker reinforcement panel 118 in the sixth exemplary embodiment, the sixth exemplary embodiment is not limited thereto. For example, as illustrated in FIGS. 14A and 14B, configuration may be such that a detection opening 140 is formed in, and the movable lid 120 is provided to, a side member outer panel 138 made of metal. Although not illustrated in the drawings, as another modified example, the movable lid 120 including the object detection sensor 58 may be provided to the rocker reinforcement panel 118 (see FIG. 13A), and a detection opening in a position corresponding to the detection opening 126 of the rocker reinforcement panel 118, together with a movable lid that opens and closes this detection opening but does not include an object detection sensor, may be provided to at least one out of a side member outer panel or a rocker molding.

Although not illustrated in the drawings, yet another modified example may be configured such that a detection opening, as well as a movable lid that opens and closes this detection opening and includes the object detection sensor 58, are provided to a rocker molding made of metal.

A configuration may also be applied in which the movable lid 120 is configured by a resin, and a holder is integrally molded to the movable lid 120 and the object detection sensor 58 is fixed by this holder, similarly to the holders 80, 86 of the above-described third exemplary embodiment.

Although the object detection sensor 58 is provided to the movable lid 120, there is no limitation thereto, and the object detection sensor 58 may be attached to another rocker configuration member. The object detection sensor 58 may be attached to the other rocker configuration member by a holder similar to the holders 80, 86 of the above-described third exemplary embodiment, or at least part of the object detection sensor 58 may be disposed in a recess, similar to the recess 92 of the fourth exemplary embodiment, formed in the rocker configuration member. Configuration may be such that a detection opening corresponding to the object detection sensor 58, together with a movable lid that opens and closes this detection opening but does not include an object detection sensor, are provided to a rocker configuration member at the vehicle width direction outer side of the object detection sensor 58.

Figure 15:
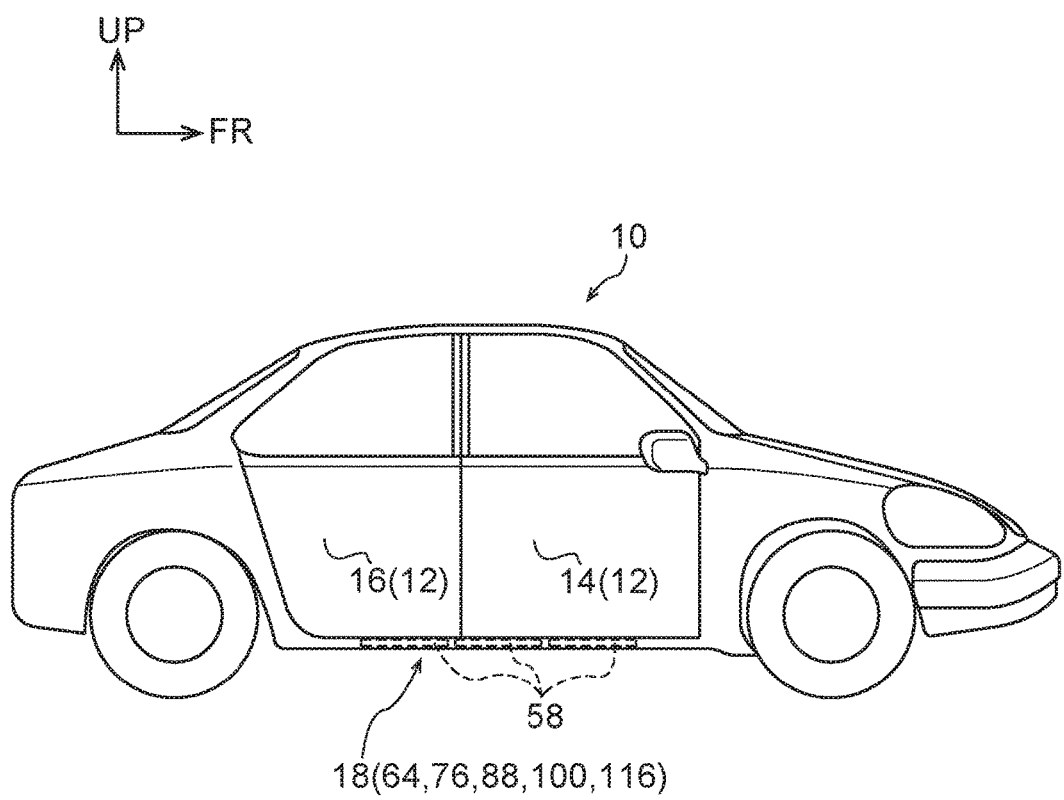
FIG. 15 is a side-on view illustrating a vehicle including a vehicular object detection device according to another exemplary embodiment.

Note that the above-described first to sixth exemplary embodiments are configured such that the object detection sensor 58 is provided to the respective rocker section 18, 64, 76, 88, 100, 116; however, there is no limitation to a single object detection sensor 58. As illustrated in FIG. 15, configuration may be such that plural object detection sensors 58 are provided to the respective rocker section 18, 64, 76, 88, 100, 116.

Exemplary embodiments of the present disclosure have been explained above; however, the present disclosure is not limited to the above description, and obviously various other modifications may be implemented within a range not departing from the spirit of the present disclosure.

What is claimed is:
1. A vehicular object detection device comprising:
   a rocker section that extends substantially along a vehicle front-rear direction, at a lower side of a side section of a vehicle, and that is configured by a plurality of rocker configuration members; and
   an object detection sensor that is disposed in the rocker section and that detects an object at at least one of a side or the lower side of the vehicle, wherein:
   among the plurality of rocker configuration members, a rocker configuration member disposed at a vehicle width direction outer side of the object detection sensor is configured by a resin, or the rocker configuration member disposed at the vehicle width direction outer side of the object detection sensor is formed with a detection opening that is open toward a vehicle outer side at a position corresponding to a transceiver of the object detection sensor.

2. The vehicular object detection device of claim 1, wherein:
among the plurality of rocker configuration members, a rocker configuration member adjacent to the object detection sensor in the vehicle width direction is integrally molded with a holder that is configured by a resin and that retains the object detection sensor.

3. The vehicular object detection device of claim 2, wherein:
another of the rocker configuration members is disposed at the vehicle width direction outer side of the rocker configuration member integrally molded with the holder, so as to cover a location of the rocker configuration member where the holder is formed.

4. The vehicular object detection device of claim 1, wherein:
a recess that is indented toward one side in the vehicle width direction and that restricts movement of the object detection sensor in a vehicle vertical direction by having at least a portion of the object detection sensor disposed inside, is formed at one of the rocker configuration members adjacent to the object detection sensor.

5. The vehicular object detection device of claim 1, wherein:
a shock-absorbing member that is configured by a foamed resin and that absorbs collision load is provided at a rocker configuration member, among the plurality of rocker configuration members, which is adjacent to the vehicle width direction outer side of the object detection sensor and which is configured by a resin; and
a shock-absorbing member-side holder that retains the object detection sensor is formed at the vehicle width direction inner side of the shock-absorbing member.

6. The vehicular object detection device of claim 1, wherein:
the rocker configuration member disposed at the vehicle width direction outer side of the object detection sensor is formed with a detection opening that is open toward a vehicle outer side at a position corresponding to a transceiver of the object detection sensor; and
a lid that is configured by a resin is provided at the detection opening formed in the rocker configuration member so as to block the detection opening.

7. The vehicular object detection device of claim 1, wherein:
the rocker configuration member disposed at the vehicle width direction outer side of the object detection sensor is formed with a detection opening that is open toward a vehicle outer side at a position corresponding to a transceiver of the object detection sensor; and
a movable lid is provided at the detection opening formed in the rocker configuration member such that the movable lid opens the detection opening formed in the rocker configuration member when the object detection sensor is operating, and closes the detection opening when the object detection sensor is not operating.

* * * * *